(12) United States Patent
Stevenson et al.

(10) Patent No.: US 9,145,524 B2
(45) Date of Patent: Sep. 29, 2015

(54) SYSTEM AND METHOD FOR HEATING A GASIFIER

(75) Inventors: John Saunders Stevenson, Anaheim, CA (US); Shashishekara Sitharamarao Talya, Humble, TX (US)

(73) Assignee: General Electric Company, Schenectady, NY (US)

(*) Notice: Subject to any disclaimer, the term of this patent is extended or adjusted under 35 U.S.C. 154(b) by 809 days.

(21) Appl. No.: 13/360,542

(22) Filed: Jan. 27, 2012

(65) Prior Publication Data
US 2013/0192137 A1      Aug. 1, 2013

(51) Int. Cl.
*C10J 3/34* (2006.01)
*C10J 3/72* (2006.01)
*C10J 3/50* (2006.01)

(52) U.S. Cl.
CPC *C10J 3/723* (2013.01); *C10J 3/506* (2013.01); *C01B 2203/049* (2013.01); *C01B 2203/0485* (2013.01); *C01B 2203/84* (2013.01); *C10J 2200/152* (2013.01); *C10J 2300/0956* (2013.01); *C10J 2300/0959* (2013.01); *C10J 2300/0989* (2013.01)

(58) Field of Classification Search
CPC .... C10J 3/506; C10J 3/723; C10J 2300/0956; C10J 2300/0959
USPC .......................................................... 48/61
See application file for complete search history.

(56) References Cited

U.S. PATENT DOCUMENTS

| 4,113,445 A | 9/1978 | Gettert et al. |
|---|---|---|
| 4,394,137 A | 7/1983 | Marion et al. |
| 4,443,228 A | 4/1984 | Schlinger |
| 4,490,156 A | 12/1984 | Marion et al. |
| 4,491,456 A | 1/1985 | Schlinger |
| 4,525,176 A | 6/1985 | Koog et al. |
| 4,775,399 A | 10/1988 | Erickson |
| 5,319,924 A * | 6/1994 | Wallace et al. ............... 60/781 |
| 5,644,933 A | 7/1997 | Rathbone |
| 7,077,202 B2 | 7/2006 | Shaw et al. |
| 7,168,488 B2 | 1/2007 | Olsvik et al. |
| 2006/0147853 A1* | 7/2006 | Lipp et al. ..................... 431/8 |
| 2011/0126743 A1* | 6/2011 | Takase et al. ............... 110/232 |

FOREIGN PATENT DOCUMENTS

| CN | 1135596 A | 11/1996 |
|---|---|---|
| CN | 1513079 A | 7/2004 |
| CN | 1549885 A | 11/2004 |
| CN | 1880214 A | 12/2006 |

OTHER PUBLICATIONS

U.S. Appl. No. 13/360,521, filed Jan. 27, 2012, John Saunders Stevenson.

* cited by examiner

*Primary Examiner* — Matthew Merkling
(74) *Attorney, Agent, or Firm* — Fletcher Yoder, P.C.

(57) ABSTRACT

A system includes a gasifier injector configured to inject a heat control fuel and a mixed air into a gasifier for combustion during a heat control mode. The heat control fuel is the same or different from the gasification fuel, and the system is configured to create the mixed air from independent supplies of oxygen and nitrogen.

31 Claims, 14 Drawing Sheets

SYSTEM AND METHOD FOR HEATING A GASIFIER

BACKGROUND OF THE INVENTION

The subject matter disclosed herein relates generally to gasifiers. More particularly, the disclosed subject matter relates to a system and method for heating a gasifier.

Gasification systems generally include a process injector used to supply a gasification fuel, such as an organic feedstock, into a gasifier along with oxygen and steam to generate a syngas. As a preliminary step, a mixture of a preheat fuel and air is combusted to preheat the gasifier to an elevated temperature before initiating gasification of the feedstock in the gasifier. Unfortunately, the elevated temperature achievable during preheat may be substantially limited by the use of air and low pressures (e.g., atmospheric pressure). As a result of this temperature limit, if the process injector cannot be installed quickly enough after preheat, then the gasifier temperature may drop below a temperature threshold suitable to start gasification of the feedstock. In the event of such excessive cooling, the preheat process would need to be repeated to raise the gasifier temperature to the elevated temperature. As a result of this delay, valuable time may be lost for gasifying the feedstock, which in turn may result in lost production of chemicals, lost generation of electricity, and so forth. The use of air and low pressures (e.g., atmospheric pressure) also may substantially limit the rate of temperature increase and the overall time required to complete the final stages of preheat. Again, this delay can result in significant losses in gasification production.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gasifier injector configured to inject a heat control fuel and a mixed air into a gasifier for combustion during a heat control mode. The heat control fuel is the same or different from the gasification fuel, and the system is configured to create the mixed air from independent supplies of oxygen and nitrogen.

In a second embodiment, a system includes a controller configured to control a heat control mode of a gasifier injector coupled to a gasifier. The heat control mode of the gasifier injector is configured to control injection of a heat control fuel and a mixed air into the gasifier for combustion, and the heat control fuel is the same or different from a gasification fuel used during a gasification mode in the gasifier. The controller is configured to control generation of the mixed air from independent supplies of oxygen and nitrogen, and the heat control mode is configured to control heating of the gasifier to a temperature at or above a temperature threshold while the gasifier is not operating in the gasification mode In a third embodiment, a method includes controlling a heat control mode of a gasifier injector coupled to a gasifier. Controlling the heat control mode includes controlling generation of a mixed air from independent supplies of oxygen and nitrogen and controlling injection of a heat control fuel and the mixed air into the gasifier for combustion. The heat control fuel is the same or different from a gasification fuel used during a gasification mode in the gasifier. Controlling the heat control mode also includes controlling heating of the gasifier to a temperature at or above a temperature threshold while the gasifier is not operating in the gasification mode.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to a system and method for heating a gasifier using manufactured air. A gasification system may manufacture air from independent supplies of oxygen and nitrogen and inject the mixed air and a heat control fuel into the gasifier for combustion to heat the gasifier when the system is not operating in a gasification mode. An injector may inject the mixed air into the gasifier when the system operates in a mixed air/fuel heat mode to heat a refractory liner of the gasifier. A controller configured to control the mixture of the oxygen and nitrogen for manufacturing the mixed air may increase the concentration of oxygen flowing into the gasifier through the injector. This may provide increased heating to the gasifier because of the relatively lower concentration of nitrogen in the mixed air. In this way, the controller transitions the gasification system from the mixed air/fuel heat mode to an oxygen enriched mixed air heat mode in order to heat the refractory liner of the gasifier above a temperature threshold.

Figure 1:
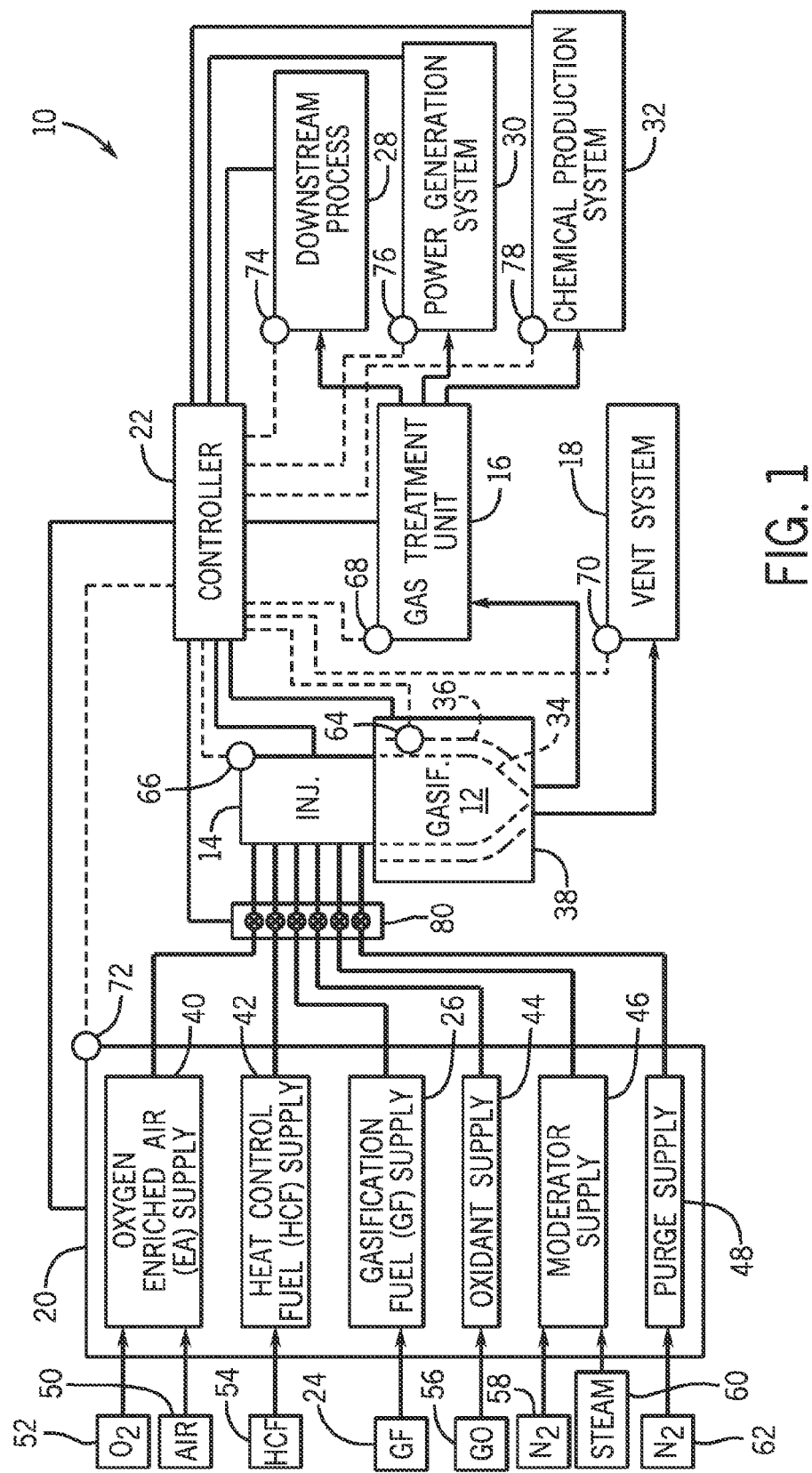
FIG. 1 is a schematic representation of an embodiment of a gasification system that may utilize oxygen enriched air for heat control of a gasifier.

Turning now to the drawings, FIG. 1 is a schematic representation of an embodiment of a gasification system 10 that may utilize oxygen enriched air for heat control of a gasifier. The gasification system 10 includes a gasifier 12, injector 14, gas treatment unit 16, vent system 18, a supply unit 20, and a controller 22. The gasifier 12 is configured to gasify a gasification fuel 24 supplied to the gasifier 12 through the injector 14. The supply unit 20 may be one or more units for preparing, storing, and/or conveying various supplies that may be injected into the gasifier 12 through the injector 14.

The gasification fuel 24 may include a variety of carbonaceous fuels, such as coal, or hydrocarbons, in a solid or liquid form, or gaseous feeds (e.g., natural gas or fuel gas). The supply unit 20 may include a gasification fuel supply 26, which may include a unit for preparing the gasification fuel 24 for gasification, e.g., by milling, shredding, and pulverizing a solid form of the gasification fuel 24. Once prepared for gasification, the gasification fuel 24 may be transmitted from the gasification fuel supply 26 to the gasifier 12 as needed. The gasifier 12 may convert the gasification fuel 24 into a syngas, e.g., a combination of carbon monoxide (CO) and hydrogen ($H_2$). This resultant gas may be termed untreated syngas, because it includes, for example, $H_2S$. The gasifier 12 may also generate byproduct material, such as slag, which may be a wet ash material. The gas treatment unit 16 may be utilized to clean the untreated syngas. The gas treatment unit 16 may scrub the untreated syngas to remove the HCl, HF, COS, HCN, and $H_2S$ from the untreated syngas. Furthermore, the gas treatment unit 16 may separate salts from the untreated syngas through water treatment techniques to generate usable salts from the untreated syngas. Subsequently, the gas from the gas treatment unit 16 may include treated syngas (e.g., the sulfur has been removed from the syngas), with trace amounts of other chemicals, e.g., $NH_3$ (ammonia) and $CH_4$ (methane). This treated syngas may then be transmitted to a downstream process 28, power generation system 30, or chemical production system 32. For example, syngas from the gas treatment unit 16 may be transmitted to a combustor chamber of a gas turbine engine in order to fuel a power generation process. The gas treatment unit 16 also may provide a back pressure control of the gasification system 10 during gasification, the back pressure control being provided in sections of the gas treatment unit used for cleaning and/or cooling the syngas. When the system 10 operates in a heat control mode using a combination injector, however, the vent system 18 may include a back pressure control that may be used to adjust a pressure in the gasifier 12.

The gasifier 12 may include a gasification chamber 34, where gasification takes place, a refractory liner 36 disposed about the gasification chamber 34, and an enclosure 38 disposed about the refractory liner. The refractory liner 36 may be made of a refractory material (e.g., ceramics) and designed to act as a thermal protective layer within the gasifier 12. In addition to protecting the enclosure 38 from high temperature operation, the refractory layer 36 may control heat loss and serve as a source of heat for a combustion process used to start the gasifier 12. Indeed, the refractory liner 36 may be heated to a temperature at or above a temperature threshold before the gasifier 12 becomes operable in a gasification mode.

In addition to the gasification fuel supply 26, the supply unit 20 may include an oxygen enriched air (EA) supply 40, heat control fuel (HCF) supply 42, oxidant supply 44, moderator supply 46, and a purge supply 48. In the illustrated embodiment, the oxygen enriched air supply 40 supplies oxygen enriched air, which includes air 50 enriched with additional oxygen 52, to the first injector 14. Likewise, the HCF supply 42 supplies HCF 54, which may be the same or different from the gasification fuel 24, to the first injector. For example, the HCF 54 may be a clean fuel, such as natural gas, whereas the gasification fuel 24 may be a slurry of coal mixed with water. The first injector 14 injects the incoming HCF 54 and oxygen enriched air to the gasifier 12 for combustion during a heat control mode (e.g., preheat or heat maintenance) of the gasification system 10. That is, when the gasifier 12 is not operating in a gasification mode, oxygen enriched air and the HCF 54 may be supplied to the gasifier 12 in order to heat the refractory liner 36 of the gasifier 12 to a temperature at or above a desired gasifier temperature threshold. This may apply to both preheating operations and heat maintenance operations, which are discussed in detail below.

The oxidant supply 44 may provide a desired amount of gasification oxidant (GO) 56, such as oxygen, to the injector 14. A mixture of nitrogen gas 58 and steam 60 may be provided to the injector 14 as well via the moderator supply 46, and nitrogen gas 62 and/or steam also may be supplied to the injector 14 via the purge supply 48. In other embodiments, the moderator supply 46 may provide recycled $CO_2$ or syngas to the injector 14 for use as a moderator during the gasification mode. The moderator (e.g., nitrogen 58 and/or steam 60, $CO_2$, or syngas), gasification fuel 24, and gasification oxidant 56 are supplies used during gasification, which may be sequenced into the gasifier 12 through injector 14, flowing continuously through injector 14 while the system 10 operates in a gasification mode. The purge supply 48 may be used to purge certain passages within the injector 14 during specific operations of the gasifier 12, e.g., purging the injector 14 of HCF 54 when changing from a heat control mode to a gasification mode. An air separation unit may operate to separate air supplied by an air compressor into component gases by, for example, distillation techniques for providing certain supplies (e.g., additional oxygen 52, gasification oxidant 56, and/or nitrogen 58 and 62). The air separation unit also may provide oil-free air 50, or oil-free air 50 may be provided by a dedicated air compressor.

The controller 22 is configured to control a heat mode of the injector 14 coupled to the gasifier 12 based on sensor feedback. That is, the controller 22 may control an amount of the additional oxygen 52 in the oxygen enriched air based on sensor feedback. It should be noted that whenever the controller 22 adjusts (e.g., increases) the amount of the additional oxygen 52 in the oxygen enriched air, the controller 22 also may adjust (e.g., decrease) the amount of air flowing to the injector 14 in order for the feeds to produce a desired flame temperature (e.g., maintain or increase the flame temperature) in gasifier 12. The gasification system 10 may include at least one sensor to obtain sensor feedback indicative of a temperature, a pressure, a fuel parameter of the HCF 54, a purity of the additional oxygen 52, a property of the air 50, a property of the oxygen enriched air, a parameter of the gasifier 12, or a combination thereof. For example, the controller 22 may receive sensor feedback indicative of a temperature from a sensor 64 located in the gasifier 12. Although shown coupled to the refractory liner 36 of the gasifier 12, this sensor 64 may be placed on other components about the gasifier 12 and calibrated to provide an approximate temperature of the refractory liner 36 or other gasifier components. Additional sensors 66, 68, 70, 72, 74, 76, and 78 may measure parameters from other components of the system 10 including the injector 14, gas treatment unit 16, vent system 18, supply unit 20, downstream process 28, power generation system 30, and chemical production system 32, respectively. The controller 22 may control the operations of gasifier 12, injector 14, gas treatment unit 16, vent system 18, supply unit 20, downstream process 28, power generation system 30, and chemical production system 32 based on the feedback received from the sensors 64, 66, 68, 70, 72, 74, 76, and 78. The controller 22 may also operate supply valves 80 in order to permit a desired flow of heating and gasification supplies from the supply unit 20 to the injector 14 based on the sensor feedback. For example, during the transition from heat control mode to gasification mode, as further discussed below, the sensor 64 may measure a temperature of the refractory liner 36 that is below the desired threshold temperature of the gasifier 12. In response, the controller 22 may control the valves 80 in order to prevent flow of the gasification fuel 24 and gasification oxidant 56 to the injector 14 unless the gasifier 12 is at or above the threshold temperature for operating in the gasification mode.

It should be noted that although the illustrated embodiment includes a single supply unit 20 and series of valves 80 for controlling the flow of supplies to the injector 14, other arrangements may be possible. For example, the heat control supplies (i.e., the oxygen enriched air supply 40 and HCF supply 42) may be in a different location than the gasification supplies (i.e., the GF supply 26, oxidant supply 44, moderator supply 46, and purge supply 48). Also, the nitrogen 58 used for the moderator supply 46 and the nitrogen 62 used for the purge supply 48 may come from a common source of nitrogen. In addition, the heat control supplies may include additional and separate purges. Moreover, one or more of valves 80 used to control the flow of these supplies to the injector 14 may be positioned upstream of or within the supply unit 20, allowing, for example, the controller 22 to vary the oxygen concentration of the enriched air supply 40 before the enriched air reaches or flows from the supply unit 20.

Figure 2:
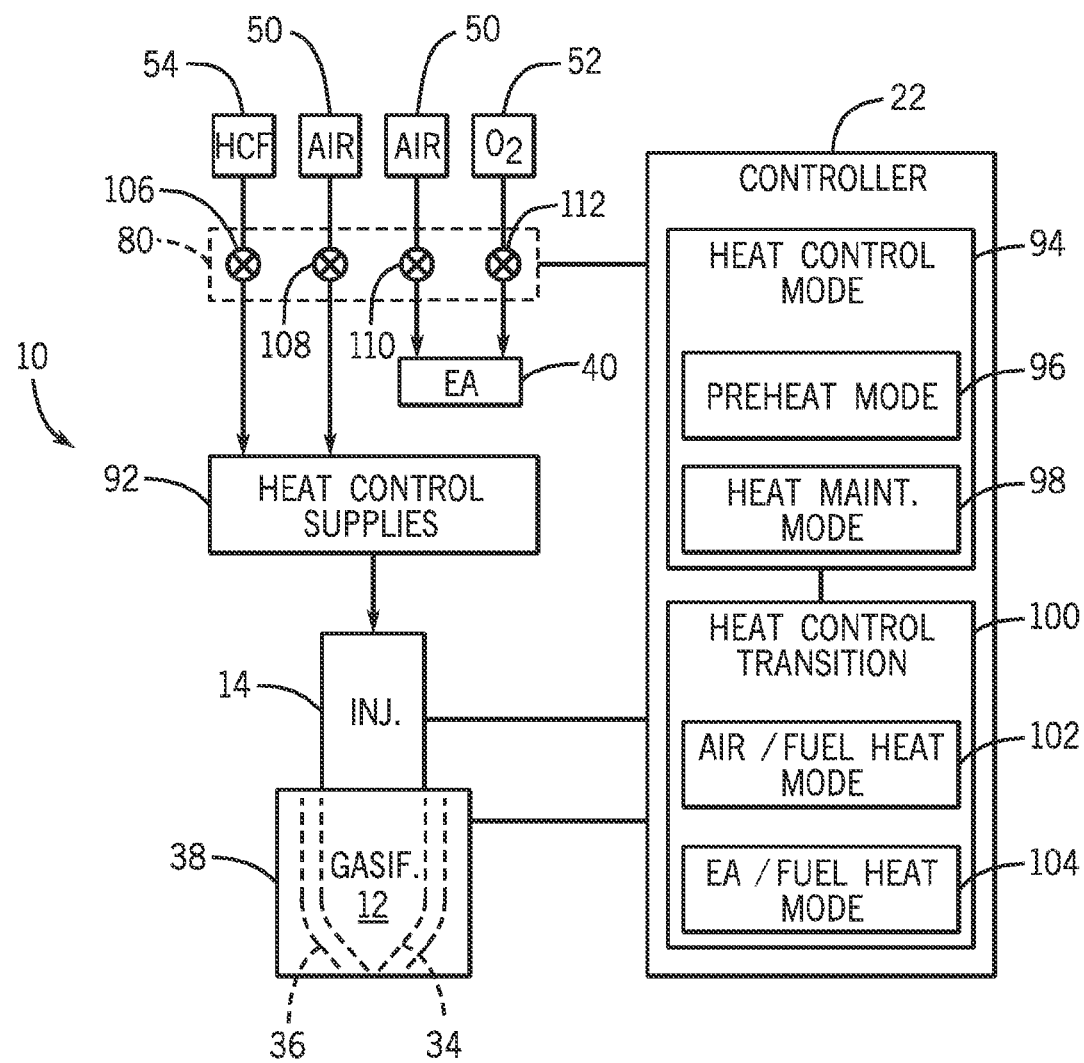
FIG. 2 is a schematic representation of an embodiment of certain components of the gasification system of FIG. 1 for use with a preheat injector.

FIG. 2 is a schematic representation of an embodiment of certain components of the gasification system 10 of FIG. 1 that may be used when the injector 14 is designed for heating of the gasifier 12. In certain embodiments, the illustrated injector 14 may be a preheat injector used to preheat the refractory liner 36 of the gasifier 12 to a desired temperature prior to operating the gasifier 12 in gasification mode. In other embodiments, the injector 14 may be a heat maintenance injector used to maintain heat in the refractory liner 36 after operating the gasifier 12 in the gasification mode, but before restarting the gasifier 12 in the gasification mode. The injector 14, when used for heating only, may be removed and replaced with a second injector to inject the gasification fuel, oxidant, and moderator into the gasifier 12 for gasification during the gasification mode. Whether used for preheating the gasifier 12 or maintaining heat in the gasifier 12, the injector 14, which may be the same or a different injector for preheating and maintaining heat, is configured to inject heat control supplies 92 into the gasifier 12. Once injected into the gasifier 12, the HCF 54 and air 50 are combined and ignited, establishing combustion within the gasifier 12 to heat the refractory liner 36 to the desired temperature. It should be noted that the injector 14 includes multiple passages through which the heat control supplies 92 (i.e., the HCF 54, air 50, and oxygen enriched air 40) are routed to the injector 14. The different routes through the injector may facilitate the combination of the heat control supplies 92 as they enter the gasifier 12.

Based on the desired function of the injector 14, the controller 22 operates the valves 80 to control the flow of the corresponding heat control supplies 92 to the injector 14 and from the injector 14 into the gasifier 12. The controller 22 may operate these valves 80 and other components of the gasification system 10 according to a heat control mode 94. In the heat control mode 94, the injector 14 is configured to inject the HCF 54 and either the air 50 or the oxygen enriched air 40 into the gasifier 12 for combustion during the heat control mode 94. The heat control mode 94 may include a preheat mode 96 configured to operate the valves 80, first injector 14, and gasifier 12 in order to preheat the gasifier 12 prior to operating the gasifier 12 in a gasification mode. Additionally, the heat control mode 96 may include a heat maintenance mode 98 for operating the valves 80, first injector 14, and gasifier 12 in order to maintain heat within the refractory liner 36 of the gasifier 12. Further, the heat control mode 94 may include a heat control transition 100 from an air/fuel heat mode 102 to an oxygen enriched air/fuel heat mode 104, allowing the system 10 to increase and decrease a ratio of the additional oxygen 52 to the air 50 and a flow rate of the air 50. For example, at the beginning of the preheat mode 96 or the heat maintenance mode 98, the controller 22 may position the valves 80 such that an HCF valve 106 and a first air valve 108 are opened and oxygen valve 112 is maintained closed. This corresponds to the controller 22 operating the system 10 in the air/fuel heat mode 104 (i.e., no oxygen enrichment of the air). As the system 10 continues to operate in the heat control mode 94 and the refractory liner 36 increases in temperature, the heat control transition 100 may control the valves 80 to open the oxygen valve 112 and partially close air valve 108. Consequently, the oxygen 52 is added to a reduced amount of air 50, and the oxygen enriched air 40 is supplied to the injector 14 for heating the refractory liner 36 of the gasifier 12. The composition and flow rate of the oxygen enriched air 40, which contains a lower percentage of nitrogen and a higher percentage of oxygen than the air 50, may thus be controlled to allow the temperature of the refractory liner 36 to increase above a temperature that is possible through combustion using the air 50 without the additional oxygen 52. Adjustment of the heating rate also may include adjusting the throughput of the heat control supplies. For example, to increase the rate of heating in the heat control mode 94, controller 22 may increase the flow rate of HCF 54 and also adjust the flow rates of air 50 and oxygen 52 to control to a desired oxygen content in oxygen enriched air 40 and/or a desired level of excess air. In another embodiment, the heat control mode 94 includes an air/fuel heat mode 102 in which the air already contains a higher percentage of oxygen, and the heat control transition 100 may transition the air/fuel heat mode 102 to an oxygen enriched air/fuel heat mode 104 in which the air contains an even higher percentage of oxygen and lower percentage of nitrogen.

Figure 3:
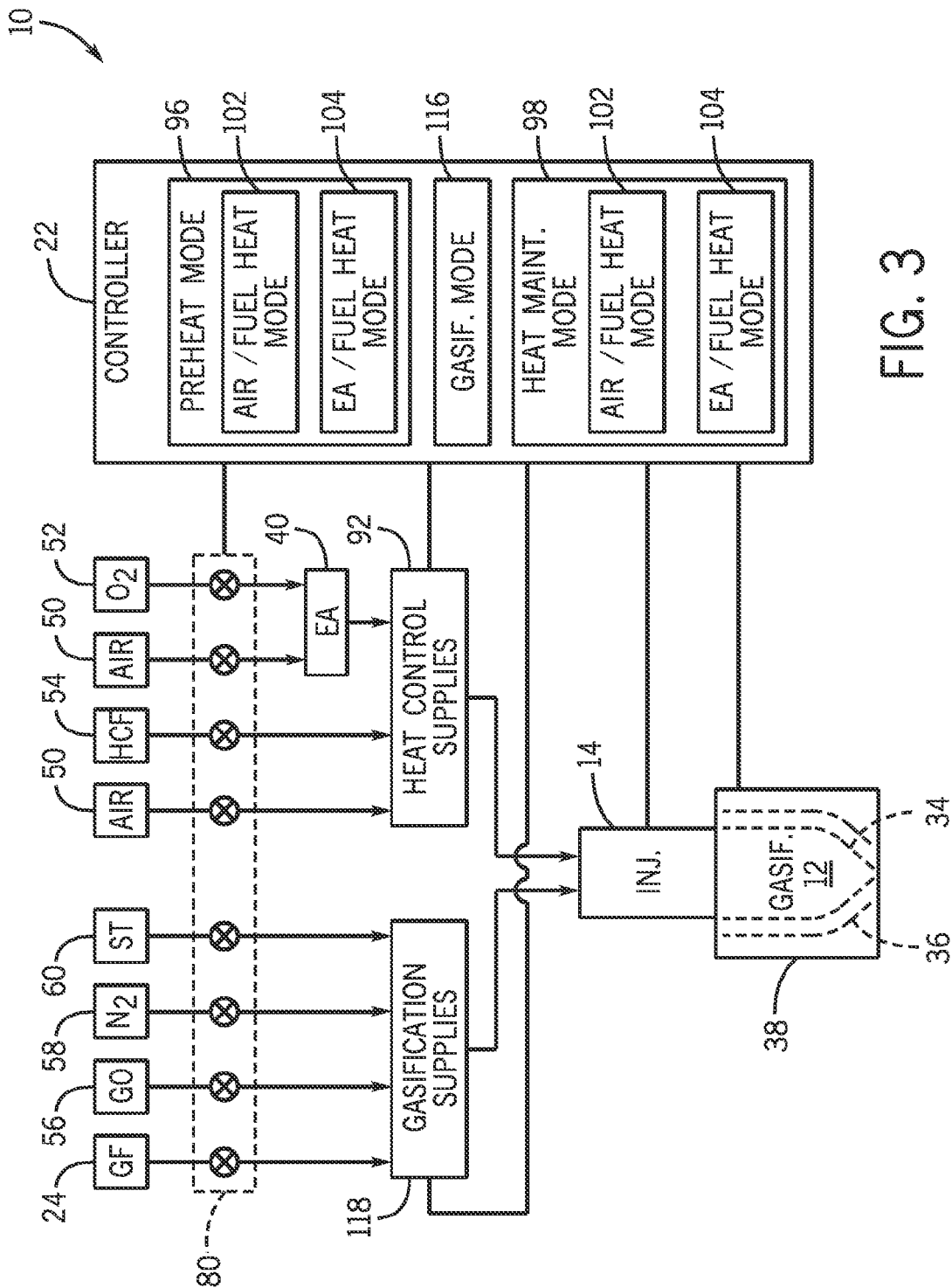
FIG. 3 is a schematic representation of an embodiment of certain components of the gasification system of FIG. 1 for use with a combination injector.

FIG. 3 is a schematic representation of an embodiment of certain components of the gasification system 10 of FIG. 1 for use when the first injector 14 is designed for both heating of the gasifier 12 and gasification. That is, the first injector 14 may be a combination injector (e.g., combi-injector) configured to inject the HCF 54 and the oxygen enriched air 40 into the gasifier 12 for combustion during a heat control mode and to inject the gasification fuel 24 and gasification oxidant 56 into the gasifier 12 for gasification during a gasification mode 116. The controller 22 may operate the injector 14, gasifier 12, and supply valves 80 according to controls for the preheat mode 96, as described in relation to the heat control mode 94 of FIG. 2. The preheat mode 96 includes transitioning from the air/fuel heat mode 102 to the oxygen enriched air/fuel heat mode 104 prior to gasification. As previously discussed, this transition may be accomplished by increasing the additional amount of oxygen 52 added to air that is already enriched with oxygen in the air/fuel heat mode 102. In this way, the gasifier 12 may be preheated using only oxygen enriched air. Once the threshold temperature of the refractory liner 36 is reached, the controller 22 may reconfigure the injector 14 for use in the gasification mode 116 based on sensor feedback. First, to transition to the gasification mode 116, the valves 80 corresponding to the heat control supplies 92 may be closed in order to allow the gasification supplies 118 to flow through the same passages of the injector 14 and into the gasifier 12 for gasification. Second, the valves 80 corresponding to the gasification fuel 24, gasification oxidant 56, nitrogen 58, and steam 60 may be opened to provide the gasification supplies 118 to the injector 14. At some time, it may be desirable to take the gasifier offline, e.g., transitioning from the gasification mode 116 to the heat maintenance mode 98. Accordingly, the controller 22 may operate the valves 80 to block the gasification supplies 118 and then enable the heat control supplies 92. Accordingly, the controller 22 may operate the valves 80, injector 14, and gasifier 12 according to the heat maintenance mode 98 described previously, including transitioning from the air/fuel heat mode 102 to the oxygen enriched air/fuel heat mode 104. Thus, the same injector 14 may be operated in and transitioned between the preheat mode 96, gasification mode 116, and heat maintenance mode 98. The process of transitioning between these three operating modes includes many other steps, which are described in detail below in relation to FIGS. 4-6.

It should be noted that the modes (e.g., preheat mode 96, heat maintenance mode 98, gasification mode 116, air/fuel heat mode 102, and oxygen enriched air/fuel heat mode 104) in the controller 22 may include code or instructions that are encoded in programs that may be executed to calculate appropriate positions of the valves 80. The code or instructions may be stored in any suitable article of manufacture that includes at least one tangible non-transitory, machine readable medium, such as a memory of the controller 22, a computing device having the controller 22, etc.

Figure 5:
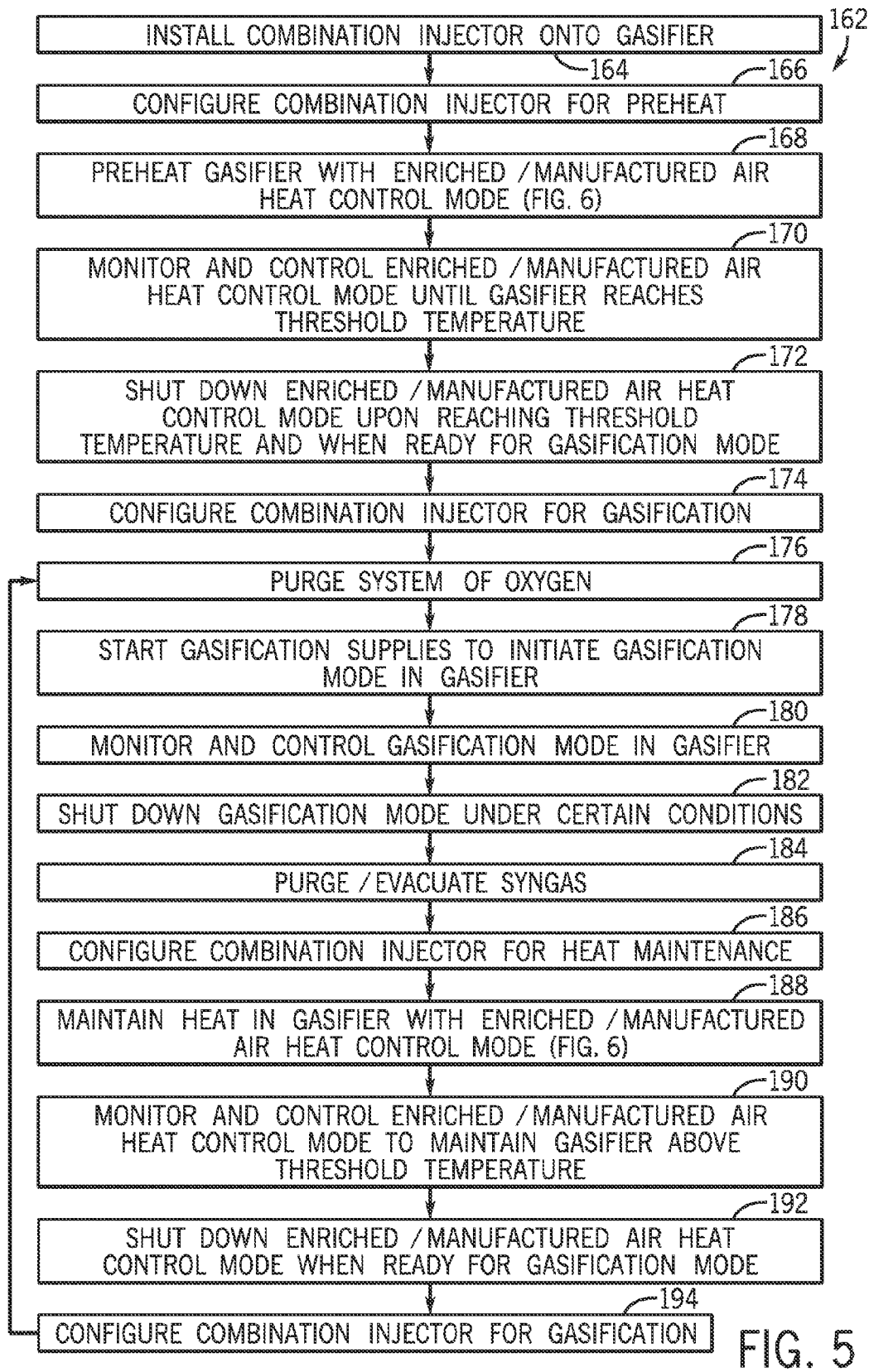
FIG. 5 is a flow chart of an embodiment of a method for heating a gasifier with oxygen enriched/manufactured air and operating the gasifier using a combination injector.
Figure 6:
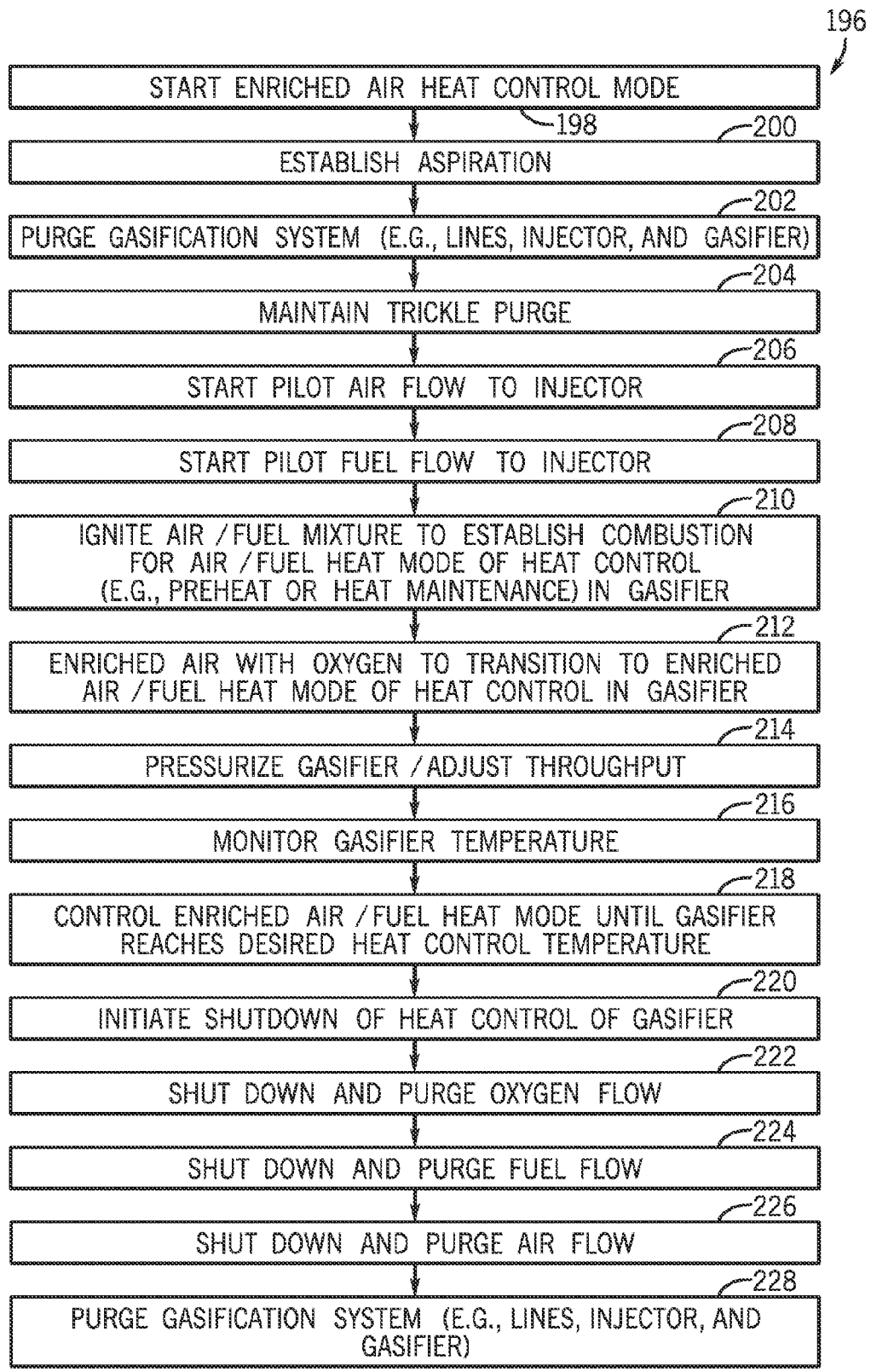
FIG. 6 is a flow chart of an embodiment of a method for operating certain components of a gasification system in an oxygen enriched air heat mode.

FIGS. 1-3 illustrate a gasification system that enriches air with additional oxygen to supply the oxygen enriched air 40 for heating the gasifier. In addition, a similar effect may be achieved by manufacturing an oxygen enriched air from its constituent parts (i.e., nitrogen and oxygen). A gasification system that operates by mixing air in this way is described in detail below. The flow charts of FIGS. 4-6 are applicable to both gasification systems that enrich air (e.g., add oxygen to air) supplied by an air supply, and systems that mix air from nitrogen and oxygen.

Figure 4:
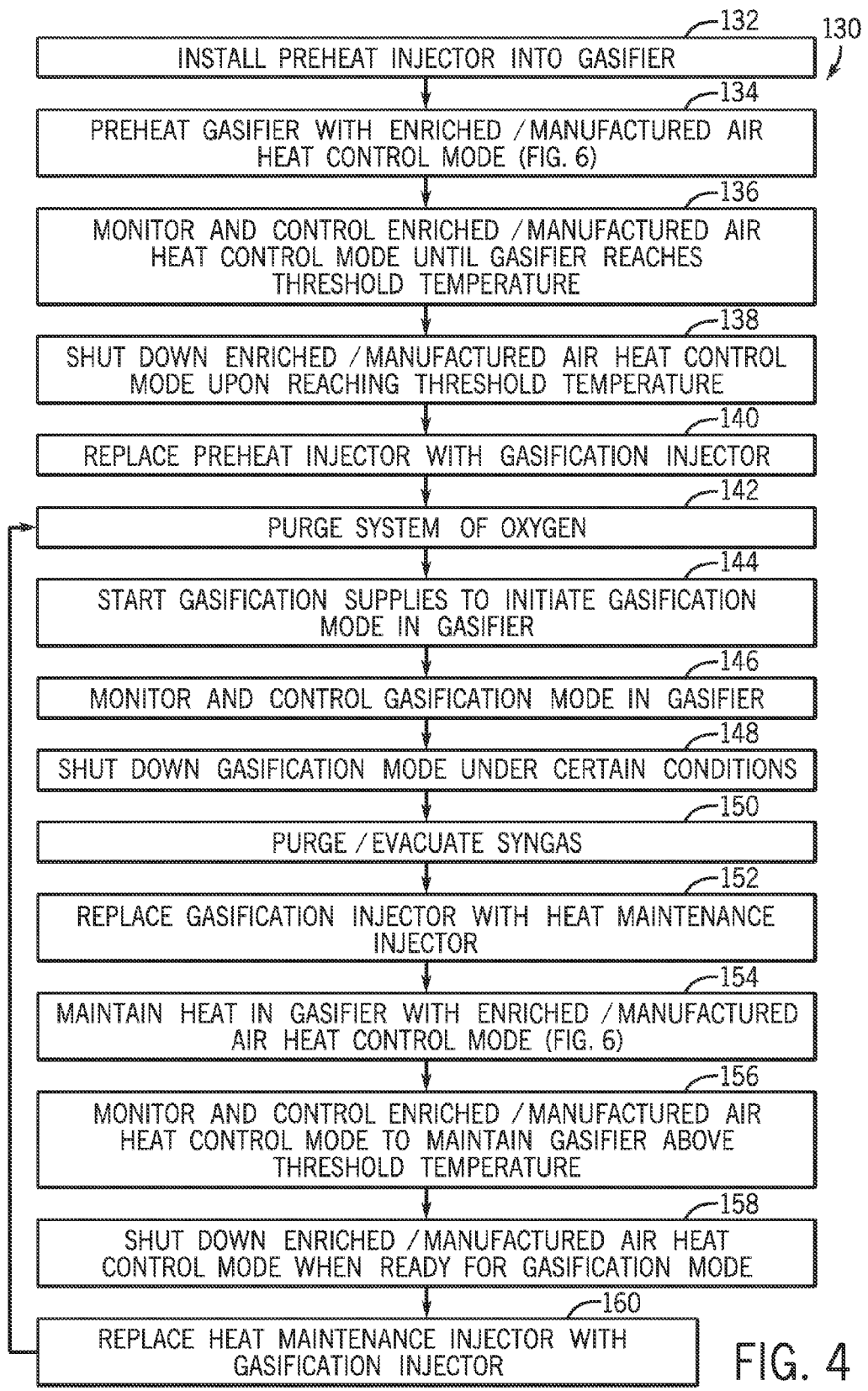
FIG. 4 is a flow chart of an embodiment of a method for heating a gasifier with oxygen enriched/manufactured air using a preheat injector.

FIG. 4 is a flow chart of an embodiment of a method 130 for heating a gasifier with oxygen enriched air or a manufactured air using a preheat injector, such as the injector of FIG. 2. This injector may be used specifically to preheat the gasifier to a desired temperature prior to gasification using oxygen enriched air or manufactured air. As previously mentioned, using air enriched with a higher content of oxygen and an appropriately adjusted (e.g., decreased) proportion of air for combustion to heat the refractory liner of the gasifier may allow the gasifier to reach a higher temperature than would be possible using air with a lower content of additional oxygen, while also providing a faster rate of heating. Consequently, the gasifier may remain at an appropriate gasification temperature for a longer amount of time. It should be noted that at least some or all of the steps listed in the method 130 may be computer implemented steps, and thus may correspond to code or instructions stored on a non-transitory, tangible, machine readable medium, such as a memory.

The method 130 includes installing the preheat injector onto the gasifier, as represented by block 132. Installation may include coupling and sealing the injector with an opening of the gasifier and connecting appropriate feeds of the heat control supplies (e.g., HCF, air, and additional oxygen) to the injector. After installation, the method 130 includes preheating the gasifier with an enriched/manufactured air heat control mode (block 134). The enriched air heat control mode corresponds to an oxygen enriched air heat mode, where air is enriched with additional oxygen, and the manufactured air heat mode corresponds to an enriched mixed air heat mode, where nitrogen and oxygen are mixed to create an oxygen enriched air. Specific steps for preheating the gasifier are discussed in detail below, including a transition from an air heat mode to an oxygen enriched air heat mode. The method 130 further includes monitoring and controlling the enriched/manufactured air heat control mode until the gasifier reaches the threshold temperature (block 136). The temperature threshold may be a preset value based on the particular gasifier in use and/or the specific gasification process. Upon reaching the threshold temperature for the gasification process, the enriched/manufactured air heat control mode may be shut down (block 138). Shutting down the enriched/manufactured air heat control mode, discussed in detail below, may include a reversal of the steps taken to preheat the gasifier.

Once the enriched/manufactured air heat control mode is shut down, the method 130 includes replacing the preheat injector with a gasification injector (block 140), i.e., an injector that may be operated in a gasification mode. In other words, the preheat injector and the gasification injector are two separate injectors, which may be mutually exclusively mounted to an inlet of the gasifier. The gasification injector may be used to inject the gasification supplies (e.g., the gasification fuel, oxidant, and moderator) into the gasifier for gasification. During the time used to replace the injectors, e.g., uncoupling the first (preheat) injector from the gasifier and coupling the second (gasification) injector to the gasifier, the temperature of the refractory liner in the gasifier may begin to lose heat. By preheating the gasifier temperature to a relatively higher temperature using the oxygen enriched air, the gasifier may remain above the temperature threshold long enough for installation of the gasification injector. This additional heat and time may substantially reduce the possibility of the gasifier cooling below a lower temperature threshold suitable for gasification.

After replacing the preheat injector with the gasification injector, the method includes purging the system of oxygen (block 142). The gasification process may be performed under relatively fuel rich conditions, while preheating is performed under relatively fuel lean conditions. Therefore, it may be desirable to purge the system of residual gases before transitioning from a heating mode to the gasification mode and vice versa. The method 130 then includes starting the gasification supplies to initiate a gasification mode in the gasifier (block 144). This may include supplying the gasification fuel, gasification oxidant, and moderator, which may include one or both of steam and nitrogen, to the gasifier for converting the gasification fuel into syngas. The method 130 also includes monitoring and controlling the gasification mode in the gasifier (block 146). This may be accomplished by the controller 22, as shown in FIG. 3, where the controller is configured to operate the injector, gasifier, supply valves, and other components during the gasification mode. The gasification process may be controlled based on sensor feedback received by the controller from sensors placed throughout the gasification system. The method 130 further includes shutting down the gasification mode under certain conditions (block 148). One such condition may include a need for maintenance, service, or repair, which may be determined through feedback from sensors located in the gasifier, injector, gasification fuel supply, gas treatment unit, and the like. When the gasification mode is shut down, the method 130 includes purging/evacuating the syngas from the gasifier (block 150). This may be accomplished by depressurizing the gasifier, establishing a vacuum between the gasifier and the injector, and injecting a purge supply of nitrogen and/or steam into the gasifier through the injector as operated by the controller. As a result, the produced syngas may be evacuated from the gasification chamber to the gas treatment unit for treatment and eventual use in downstream processes, power generation, or chemical production.

After gasification, the method 130 includes replacing the gasification injector with a heat maintenance injector (block 152). This injector, like the preheat injector, may be utilized in the heat control mode, and in certain embodiments the injector may be the same as the preheat injector. The heat maintenance injector is then used to maintain heat in the gasifier with the enriched/manufactured air heat control mode (block 154). The enriched/manufactured air heat control mode for heat maintenance is described in detail below, and uses a similar sequence of steps as the enriched/manufactured air heat mode for preheating the gasifier. The difference is that the preheating process introduces heat to the gasifier prior to gasification, while the heat maintenance is used to maintain heat that is already present in the gasifier before gasification. In the illustrated embodiment, the heat maintenance is used to maintain heat in the gasifier after gasification but before starting gasification again. In other embodiments, however, the heat maintenance may be used to maintain heat in the gasifier after preheating the gasifier but before beginning gasification. As before, the controller may monitor and control the enriched/manufactured air heat control mode (block 156) in order to maintain a temperature of the gasifier above a threshold temperature. This threshold temperature may be the same threshold temperature desired for preheating the gasifier with the preheat injector. The method 130 then includes shutting down the enriched/manufactured air heat control mode when the gasification system is ready for the gasification mode (block 158), and replacing the heat maintenance injector with the gasification injector (block 160). This may begin the process again starting from block 142, as the system is operated in gasification mode.

FIG. 5 is a flow chart of an embodiment of a method for heating a gasifier with oxygen enriched/manufactured air and operating the gasifier using a combination injector (e.g., heat control injector and gasification injector). Many steps in the method 162 are similar to those from method 130 of FIG. 4, and at least some or all of the steps may be computer implemented steps corresponding to code or instructions stored on a non-transitory, tangible, machine readable medium, such as a memory. Since this method 162 uses a combination injector, the same injector may be operated in both the enriched/manufactured air heat control mode and the gasification mode. In addition, the combination injector may be used for preheating the gasifier as well as maintaining heat in the gasifier when not operating in the gasification mode. Instead of replacing one injector for another when switching between modes, the same injector is reconfigured from the enriched/manufactured air heat mode to the gasification mode and vice versa.

The method 162 includes installing the combination injector onto the gasifier (block 164), configuring the combination injector for preheat (block 166), and preheating the gasifier with the enriched/manufactured air heat control mode (block 168). The method 162 also includes monitoring and controlling the enriched/manufactured air heat control mode until the gasifier reaches a threshold temperature (block 170) and shutting down the enriched/manufactured air heat control mode upon reaching the threshold temperature and when ready for gasification mode (block 172). The combination injector may then be configured for gasification (block 174), instead of being replaced by a different injector. Further, the method 162 includes purging the system of oxygen (block 176), which may include flowing nitrogen or steam through the combination injector, before starting a flow of the gasification supplies to initiate the gasification mode in the gasifier (block 178). The gasification mode may be monitored and controlled by the controller (block 180), and shut down under certain conditions (block 182) such as a need for maintenance, service, or repair.

The method 162 further includes purging/evacuating the gasification system of syngas (block 184) before configuring the combination injector for heat maintenance (block 186). In the heat maintenance configuration, the combination injector maintains heat in the gasifier with the enriched/manufactured air heat control mode (block 188), and the controller monitors and controls the enriched/manufactured air heat control mode to maintain the gasifier above the threshold temperature (block 190) before shutting down the enriched/manufactured air heat control mode when the system is ready for the gasification mode (block 192). Still further, the method includes configuring the combination injector for gasification (block 194), which starts the method 162 again beginning with purging the oxygen (block 176). In this way, the gasifier may be cycled through heating using air enriched (or manufactured) to have higher oxygen content and gasification of the gasification fuel, all using the same combination injector.

FIG. 6 is a flow chart of an embodiment of a method 196 for operating certain components of a gasification system in an oxygen enriched air heat mode. This method 196 includes steps that apply for operating the gasification system in the oxygen enriched air heat mode for preheating and/or maintaining heat in the gasifier, as described in FIGS. 4 and 5, using either a preheat injector or a combination injector. The method 196 details the steps encompassed by preheat blocks 134, 136, and 138 and heat maintenance blocks 154, 156, and 158 for the preheat injector in FIG. 4, as well as preheat blocks 168, 170, and 172 and heat maintenance blocks 188, 190, and 192 for the combination injector in FIG. 5. As mentioned previously, the method 196 includes one or more steps that may be computer implemented steps that correspond to code or instructions stored on a non-transitory, tangible, machine readable medium, such as a memory.

The method 196 includes starting the enriched air heat control mode (block 198), beginning with establishing aspiration (block 200) between the injector and the gasifier. This may be accomplished by using steam or a vacuum pump to establish aspiration through the gasifier from the injector inlet through the gasifier outlet, and installing the injector for enriched air heat mode operation. Once the injector is installed, the method 196 includes purging the lines, injector, and gasifier of the gasification system (block 202). This purge may be accomplished by flowing an inert gas (e.g., nitrogen) from the purge supply through the injector and the gasifier in order to rid these components of residual substances from earlier gasification or heating processes. The method 196 also includes maintaining a trickle purge through certain lines and passages of the injector (block 204). The trickle purge may be a relatively low flow of the inert gas through the injector passages in order to inhibit accumulation of substances within injector passages that are not being used. Trickle purges may be adjusted as other flows are introduced into the injector. For example, the method 196 includes starting a pilot or initial air flow to the injector (block 206) and subsequently or simultaneously starting a fuel flow to the injector (block 208). As each flow is started, the trickle purge of inert gas flowing through specific passages of the injector may be decreased until the full pilot or initial air flow or fuel flow is established in the passages. In other embodiments, the trickle flow may be curtailed at the same time as or just prior to introducing the respective pilot or initial flow to a passage. The air/fuel mixture is then ignited by an igniter to establish combustion for the air/fuel heat mode of heat control (e.g., preheat or heat maintenance) in the gasifier (block 210). This combustion may begin to heat the refractory liner toward the desired threshold temperature.

In order to further increase the temperature and the rate of temperature increase of the refractory liner toward the threshold temperature, the method 196 includes enriching the air with oxygen to transition from the air/fuel heat mode to the enriched air/fuel heat mode of heat control in the gasifier (block 212). That is, additional oxygen may be progressively introduced into the airflow through the injector to enrich the air with oxygen while decreasing the air flow, thereby increasing the temperature produced through combustion of the HCF and oxygen enriched air. It may be desired for the throughput of the injector to be adjusted or the gasifier to be pressurized (block 214) as part of the heat mode operation. Throughput adjustments, as well as adjustments in the degree of oxygen enrichment and of excess air, may be made in response to the heating requirements for the refractory. During preheating and heat maintenance with a dedicated preheat or heat maintenance injector, the pressure of the gasifier is typically held under a slight vacuum, at atmospheric pressure, or slightly higher than atmospheric pressure. However, when operating with a combination injector (combi-injector), the gasifier may be pressurized to maintain one or more injector velocities below a velocity that would otherwise extinguish or destabilize the flame in the gasifier. The gasifier may be pressurized to a gasification pressure within a range of approximately 20 to 2500, 50 to 2000, 100 to 1500, or 350-1200 psi. For example, the gasifier pressure may be elevated to a pressure above approximately 30-40 psi and below approximately 2500 psi.

The method 196 further includes monitoring the gasifier temperature (block 216) by measuring the temperature of the gasifier with a sensor that communicates the recorded temperature to the controller. The controller may control the enriched air/fuel heat mode until the gasifier reaches the desired heat control temperature threshold (block 218) for the gasification system operating in the heat control mode. At this point, the method 196 includes initiating a shutdown of the heat control of the gasifier (block 220), which may be accomplished through the following three steps of the method 196. First, the oxygen flow is shut down and purged (block 222), then the fuel flow is shut down and purged (block 224), and finally the air flow is shut down and purged (block 226). In effect, this may correspond to transitioning the gasification system from the oxygen enriched air heat control mode to the air heat control mode before shutting down the flow of heat control fuel and air in the system. The various purges may be accomplished by flowing increased amounts of inert gas into the injector passages as the flows are each shut down. It should be noted that the flows are shut down (blocks 222, 224, and 226) in the opposite order in which they were previously introduced (blocks 206, 208, and 212) to the injector. Once all flows are shut down, the gasification system is purged (e.g., the lines, injector, and gasifier) with the purge supply of inert gas (block 228), readying the gasifier for the flow of the gasification supplies. In addition, the gasifier may be depressurized as the flows are being shut down (blocks 222, 224, 226) or as the gasification system is being purged (block 228).

Figure 7:
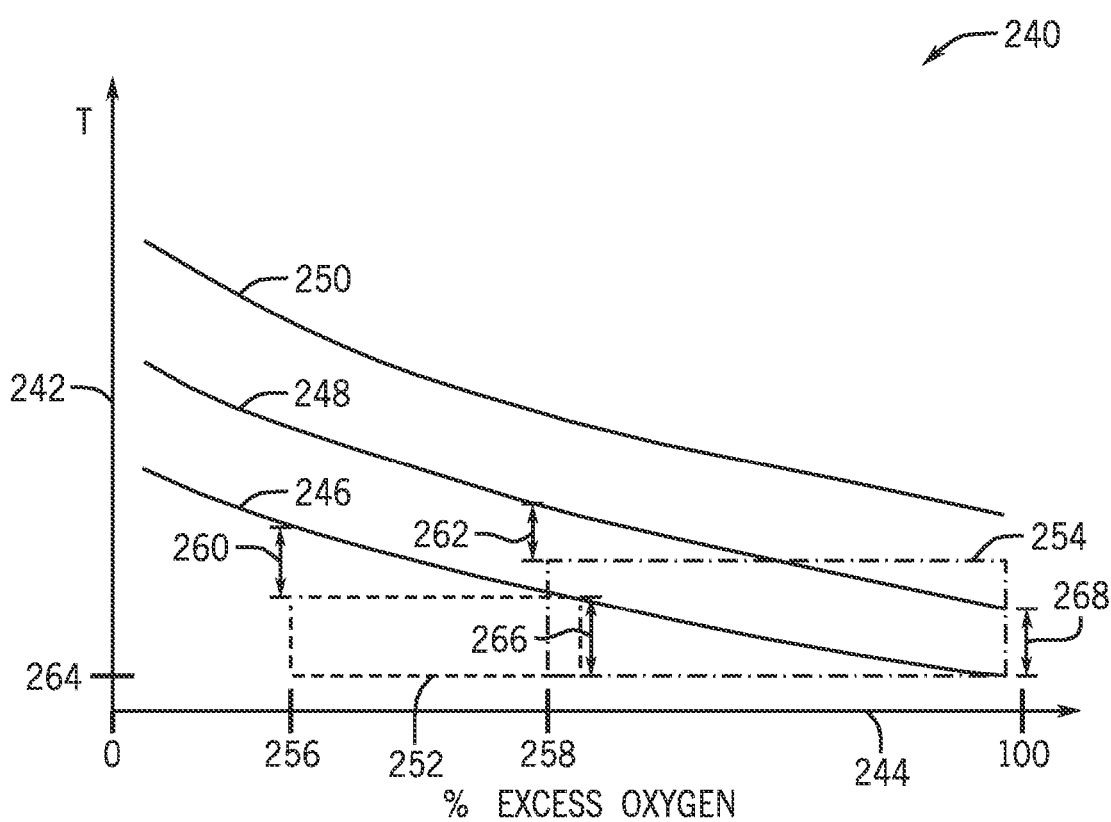
FIG. 7 is a graphical representation of an embodiment of gasifier heating when operating a gasifier in an air/fuel heat mode and in an oxygen enriched air/fuel heat mode.

FIG. 7 is a plot 240 modeling embodiments of available gasifier heating when operating a gasification system in different heat modes. The plot 240 illustrates a flame temperature of the gasifier (ordinate 242) against a percentage of excess oxygen injected into the gasifier (abscissa 244). The three curves 246, 248, and 250 depicted across the plot 240 represent the variation of an adiabatic flame temperature with respect to the percentage of excess oxygen. The first curve 246 corresponds to an adiabatic flame temperature calculated for a flame produced by igniting heat control fuel (e.g., HCF 54) with 100% air, without any additional oxygen. The second curve 248 corresponds to an adiabatic flame temperature produced by the combustion of heat control fuel (e.g., HCF 54) using a mixture of 90% air and 10% additional oxygen, by volume. Finally, the third curve 250 corresponds to an adiabatic flame temperature produced by the combustion of heat control fuel (e.g., HCF 54) using 80% air and 20% additional oxygen, by volume. The plot 240 shows that as a greater amount of oxygen is added to the air/fuel mixture injected into the gasifier 12 for heating the gasifier 12, the temperature of the gasifier 12 is increased for a given percentage of excess oxygen.

In addition to the three curves 246, 248, and 250, the plot 240 includes two operating windows 252 and 254. These operating windows 252 and 254 reflect the effective operating temperature of the refractory liner 36 for the curves 246 and 248, respectively. For example, an upper left hand corner of window 252 may represent a maximum temperature that may be achieved by heating the gasifier based on a minimum excess oxygen percentage limit 256. This minimum excess oxygen percentage limit 256 may be, for example, approximately fifteen percent excess oxygen for the air/fuel heat mode (with no additional oxygen). Similarly, looking at window 254, a minimum excess oxygen percentage limit 258 exists for air enriched with 10% additional oxygen, and this minimum limit 258 is larger than the excess oxygen percentage limit 256. In the illustrated embodiment, a distance 260 between the operating window 252 and the corresponding adiabatic curve 246 taken at the minimum excess oxygen percentage limit 256 is approximately equal to a distance 262 between the operating window 254 and the corresponding adiabatic curve 248 taken at the minimum excess oxygen percentage limit 258. A lower right hand corner of each of the operating windows 252 and 254 may represent a maximum excess oxygen percentage limit related to a minimum gasifier temperature 264. That is, in order to reach the desired gasifier temperature 264 during the final stages of heating, there is a maximum percentage of excess oxygen that may be used with the heat control fuel (e.g., HCF 54) used to heat the gasifier for a given air/oxygen mixture ratio. A distance 266 between the lower right hand corner of the operating window 252 and the corresponding adiabatic curve 246 is approximately equal to a distance 268 between the lower right hand corner of the operating window 254 and the corresponding adiabatic curve 248. The plot 240 shows that higher flame temperatures may be reached at a given percentage of excess oxygen by using air enriched with additional oxygen for heating a gasifier, as compared to air without any additional oxygen. In addition, the higher flame temperature may be achieved while using a lower percentage of fuel, making the heating process more fuel efficient. Still further, the higher flame temperature also may improve heat transfer for increasing a rate of heating toward the final stages of preheating the gasifier. As the percentage of excess oxygen 244 is increased by injecting a higher composition of oxygen into the gasifier, the controller may transition the gasification system from the air/fuel heat mode to the enriched air/fuel heat mode as the minimum limit 258 of excess oxygen percentage is reached. This may be represented by a transition from the first operating window 252 to the second operating window 254, allowing higher gasifier temperatures to be reached.

Figure 8:
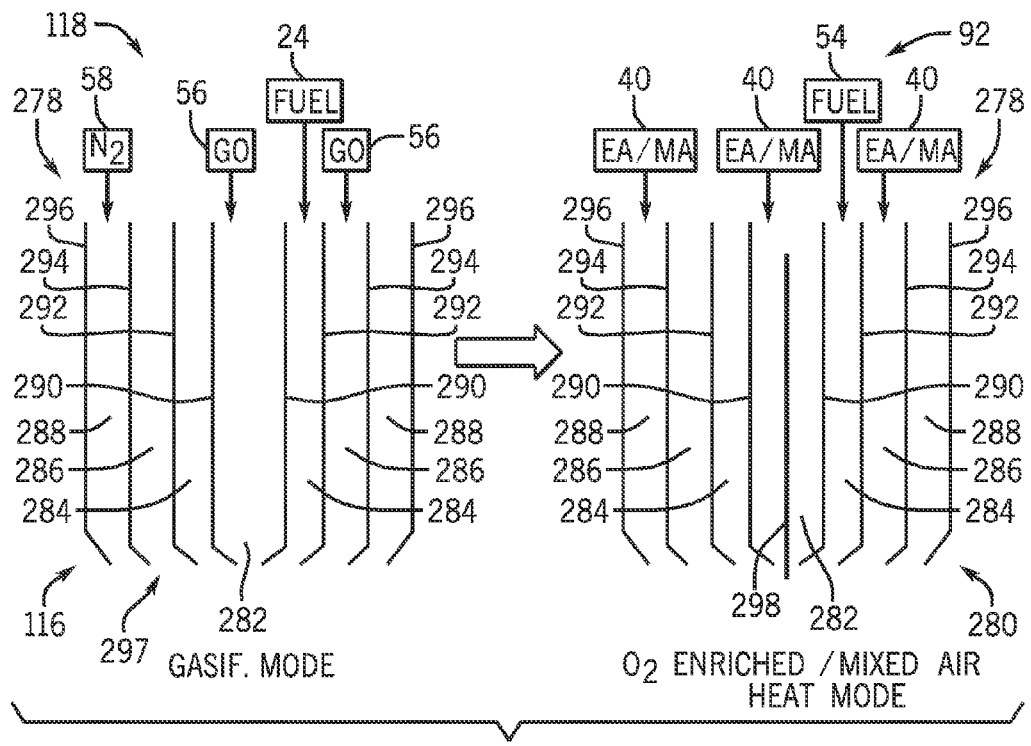
FIG. 8 is an axial perspective view of an embodiment of a fuel injector operating in a gasification mode and operating in an oxygen enriched/mixed air heat mode.

FIG. 8 is an axial perspective view of an embodiment of a combination injector 278 transitioning from the gasification mode 116 to an oxygen enriched/mixed air heat mode 280. The illustrated combination injector 278 includes four passages 282, 284, 286, and 288 through which various supplies may be injected into the gasifier 12. The illustrated embodiment shows the passage 282 as a circular passage surrounded by the annular passages 284, 286, and 288 in a concentric or coaxial arrangement. These passages 282, 284, 286, and 288 may be defined by substantially circular walls 290, 292, 294, and 296, respectively, and each wall may be axially fixed or movable relative to each other wall. In embodiments with movable walls, the controller 22 may change the relative position of the walls 290, 292, 294, and 296 (and thus angled tips 297) in order to control the relative flow rates and pressures of the gasification supplies 118 or heat control supplies 92 flowing therethrough. In the gasification mode 116, the gasification supplies 118 are configured to flow through the various passages 282, 284, 286, and 288 of the injector 278. For example, the nitrogen 58 may flow through the passage 288 while the gasification fuel 24 flows through the passage 284 and the gasification oxidant 56 (e.g., oxygen) flows through the passages 282 and 286. The nitrogen 58 may be used to purge the gasification system as appropriate, and the gasification fuel 24 and oxidant 56 may be reacted in the gasifier 12 for producing syngas. As the nitrogen 58 is used to purge the system, one or more of the walls 290, 292, 294, and 296 may be adjusted relative to each other to permit use of a relatively low flow rate of the nitrogen 58 through the passage 288.

When the illustrated injector 278 is transitioned from the gasification mode 116 to the oxygen enriched/mixed air heat control mode 280, the oxygen enriched air 40 (or mixed air using flows of nitrogen and oxygen) may be injected into the gasifier 12 through the passages 282, 286, and 288 while the HCF 54 is injected through the passage 284. In some embodiments, the heat control mode 94 may control injection of nitrogen into the gasifier 12 through the injection passage 284 along with the HCF 54. That is, the injector 278 may be configured to inject the heat control fuel 54 and nitrogen through the fuel injection passage 284 and inject the air enriched with oxygen through at least one additional injection passage. The amount of the air in the at least one additional injection passage may be reduced to account for an increase in the nitrogen in the fuel injection passage 284, and this reduction of air may be controlled by the heat control mode 94. The injection of these relative amounts of the fuel 54, nitrogen, and enriched air 40 may be adjusted by the controller 22. An igniter 298 may be extended through the innermost passage 282 of the injector 278 to ignite the heat control supplies 92 entering the gasifier 12 for heating the gasifier 12.

When used to inject mixed air (e.g., using separate flows of nitrogen and oxygen) into the gasifier 12 for heating, the injector 278 may flow different mixed air portions into the gasifier 12 through different fuel injection passages 282, 284, 286, and 288. For example, the injection passage 284 may be configured to flow a first portion of the mixed air with the heat control fuel 54 into the gasifier 12, where this portion of the mixed air is a portion of the nitrogen 326 without oxygen. This may create a diluted heat control fuel (DHCF) flow through the injection passage 284. At least one of the additional injection passages 282, 286, and 288 may inject portions of the mixed air, such as the oxygen 324, a second portion of the nitrogen 326, air, or a combination thereof, into the gasifier 12 as controlled by the heat control mode 94. The controller 22 also may reduce the amount of air in the additional passages 282, 286, and 288 to account for an increase in the nitrogen in the injection passage 284. The injector 278 may be configured to output the combined quantities of the oxygen 324, nitrogen 326, and/or air flowing through the injection passages 282, 284, 286, and 288 in a desired oxygen/nitrogen ratio. For example, the desired oxygen/nitrogen ratio may be substantially equivalent to an oxygen/nitrogen ratio of air, or the desired oxygen/nitrogen ratio may be richer in oxygen than the oxygen/nitrogen ratio of air. This allows the injector 278 to mix the first mixed air portion and the second mixed air portion to create the mixed air with an additional amount of the oxygen, creating an oxygen enriched mixed air for heating the gasifier 12. Flowing a portion of the nitrogen through the injection passage 284 with the fuel 54 may rebalance the flows through the different passages, allowing the injector 278 to operate in both the heat control mode and gasification mode since the desired relative volumetric flow rates of mixed air and fuel flowing through the injector 278 may be different in the heat control mode and the gasification mode. In other embodiments, at least one fuel passage (e.g., the injector passage 284) of the injector 278 may inject the heat control fuel 54 and a first portion of nitrogen into the gasifier while at least one other passage may inject a second portion of the nitrogen, oxygen, and/or air into the gasifier. The combined composition of the nitrogen, oxygen, and/or air may be controlled to generate a mixed air with amounts of oxygen and nitrogen substantially equivalent to air or substantially equivalent to an oxygen enriched air.

Figure 9:
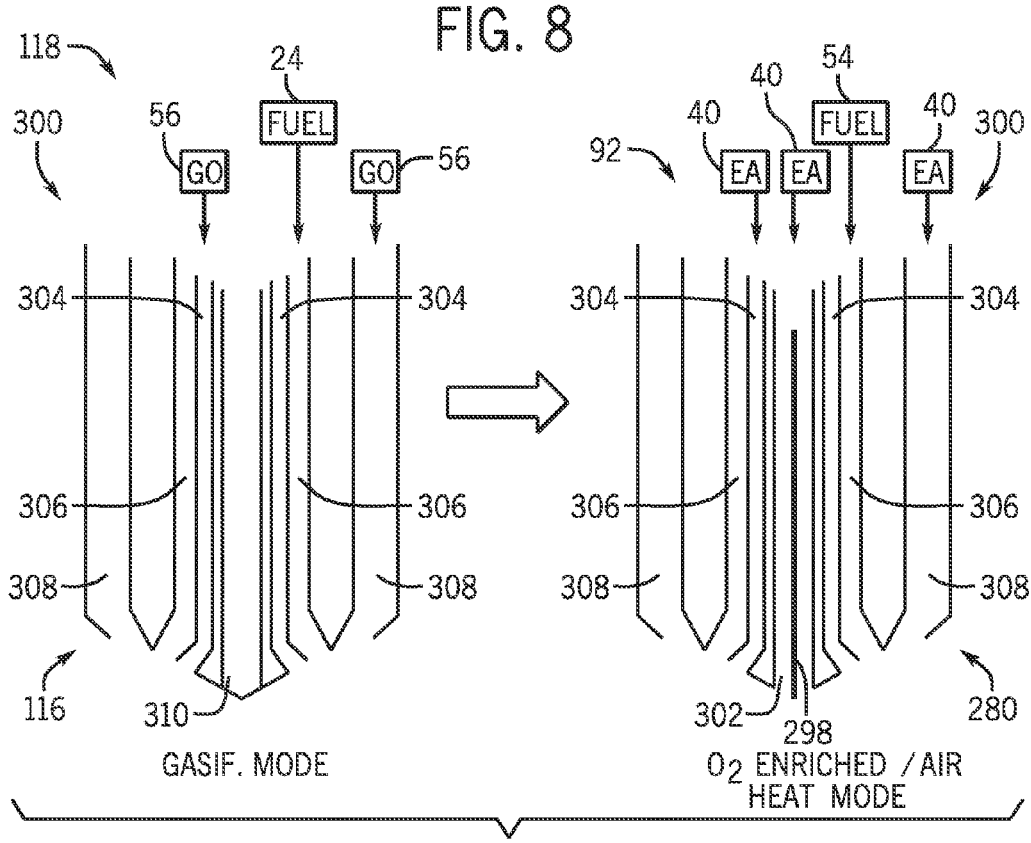
FIG. 9 is an axial perspective view of an embodiment of a fuel injector operating in a gasification mode and operating in an oxygen enriched air heat mode.

It should be noted that other arrangements of a combination injector may be used to transition between operating in the gasification mode 116 and the oxygen enriched air heat control mode 104. As an example, FIG. 9 is an axial perspective view of another embodiment of a combination injector 300 transitioning from the gasification mode 116 to an oxygen enriched air heat mode 280. This combination injector 300 includes four passages 302, 304, 306, and 308 defined by various walls that may be fixed or movable relative to each other. Instead of establishing a purge flow through one of the passages, the passage 302 may be sealed during the gasification mode 116 using a cooled insert 310. Flows of the gasification fuel 24 through passages 304 and 308 and a flow of the gasification oxidant 56 through passage 306 may be established to allow gasification of the gasification fuel 24 within the gasifier 12. As the injector 300 is transitioned from the gasification mode 116 to the oxygen enriched air heat mode 280, the cooled insert 310 may be removed or sufficiently retracted from the innermost passage 302, allowing an additional flow of the enriched air 40 to be introduced to the gasifier 12 through the injector 300. In the enriched air heat mode 280, the HCF 54 may flow through the passage 306 and the remaining amounts of the enriched air 40 may flow through the passages 304 and 308 into the gasifier 12, where combustion occurs. In addition, the igniter 298 may be placed in or extended into the passage 302 for igniting the fuel/air mixture in the gasifier 12.

Figure 10:
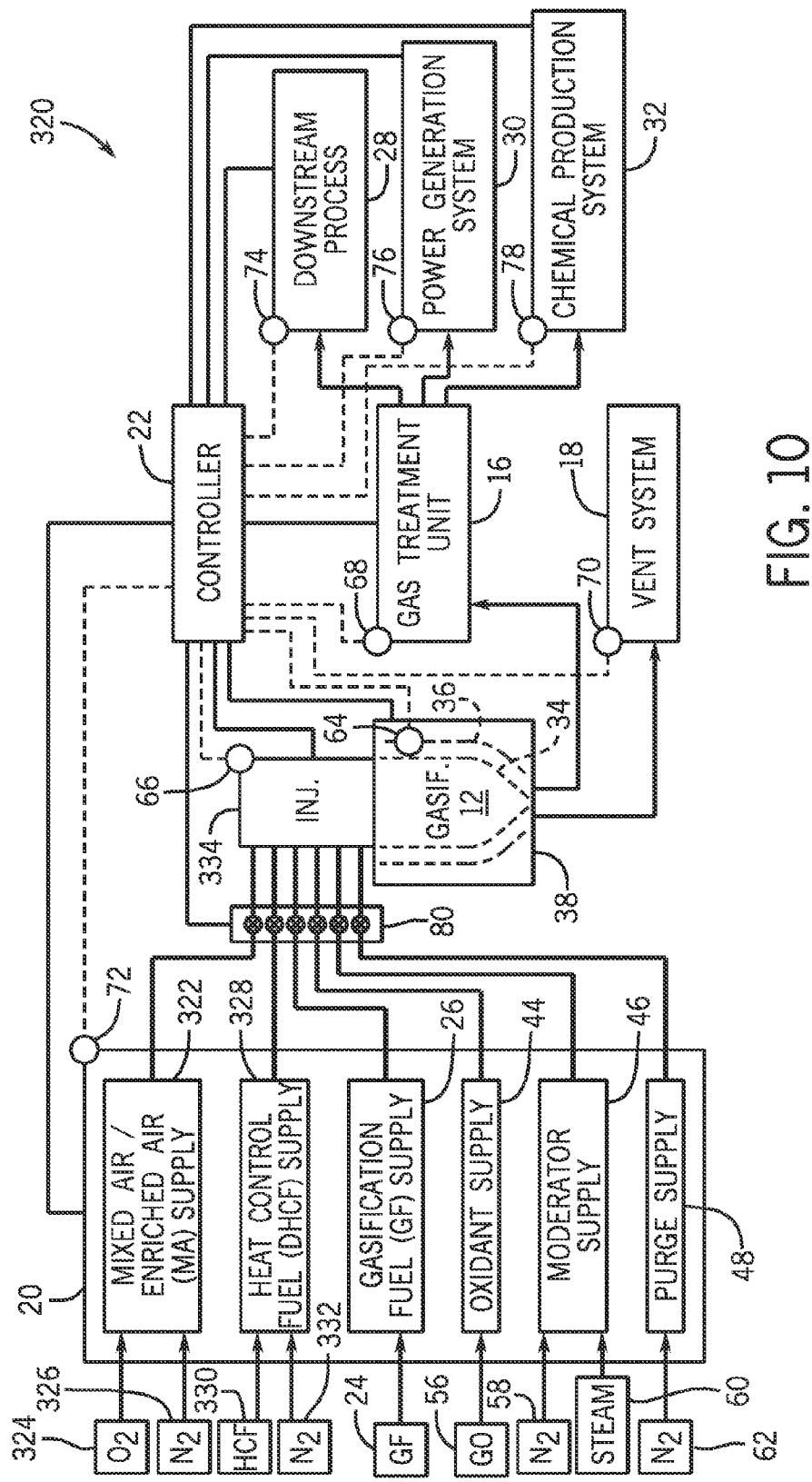
FIG. 10 is a schematic representation of an embodiment of a gasification system that may manufacture air for heat control of a gasifier.

FIG. 10 is a schematic representation of an embodiment of a gasification system 320 that may manufacture air for controlling the temperature of the gasifier 12. It should be noted that FIG. 10 includes similar elements as FIG. 1, and like elements are represented by like numbers in the two figures. The elements of FIG. 10 with numbers corresponding to like elements of FIG. 1 perform similar functions in both gasification systems 10 and 320, and will therefore not be reintroduced.

As previously mentioned, the gasification system 320 may create a mixed air (MA) 322 from independent supplies of oxygen 324 and nitrogen 326 for heating of the gasifier 12. In addition to the MA supply 322, the supply unit 20 may include a diluted heat control fuel (DHCF) supply 328 that is a mixture of HCF 330 and nitrogen 332. The different supplies in the supply unit 20, such as the DHCF supply 328 and mixed air supply 322, may be injected into the gasifier 12 by a gasifier injector 334, similar to the injector 14 of FIG. 2. Generation of the mixed air 322 from the oxygen 324 and the nitrogen 326 as well as the generation of the DHCF 328 may be controlled by the controller 22. The controller 22 may also control the generation of the mixed air 322 with a ratio of the oxygen 324 to the nitrogen 326 that is substantially equivalent to air, or with a ratio to create an oxygen enriched mixed air. The gasification fuel supply 26, oxidant supply 44, moderator supply 46, and purge supply 48 may be arranged as previously described in FIG. 1.

Figure 11:
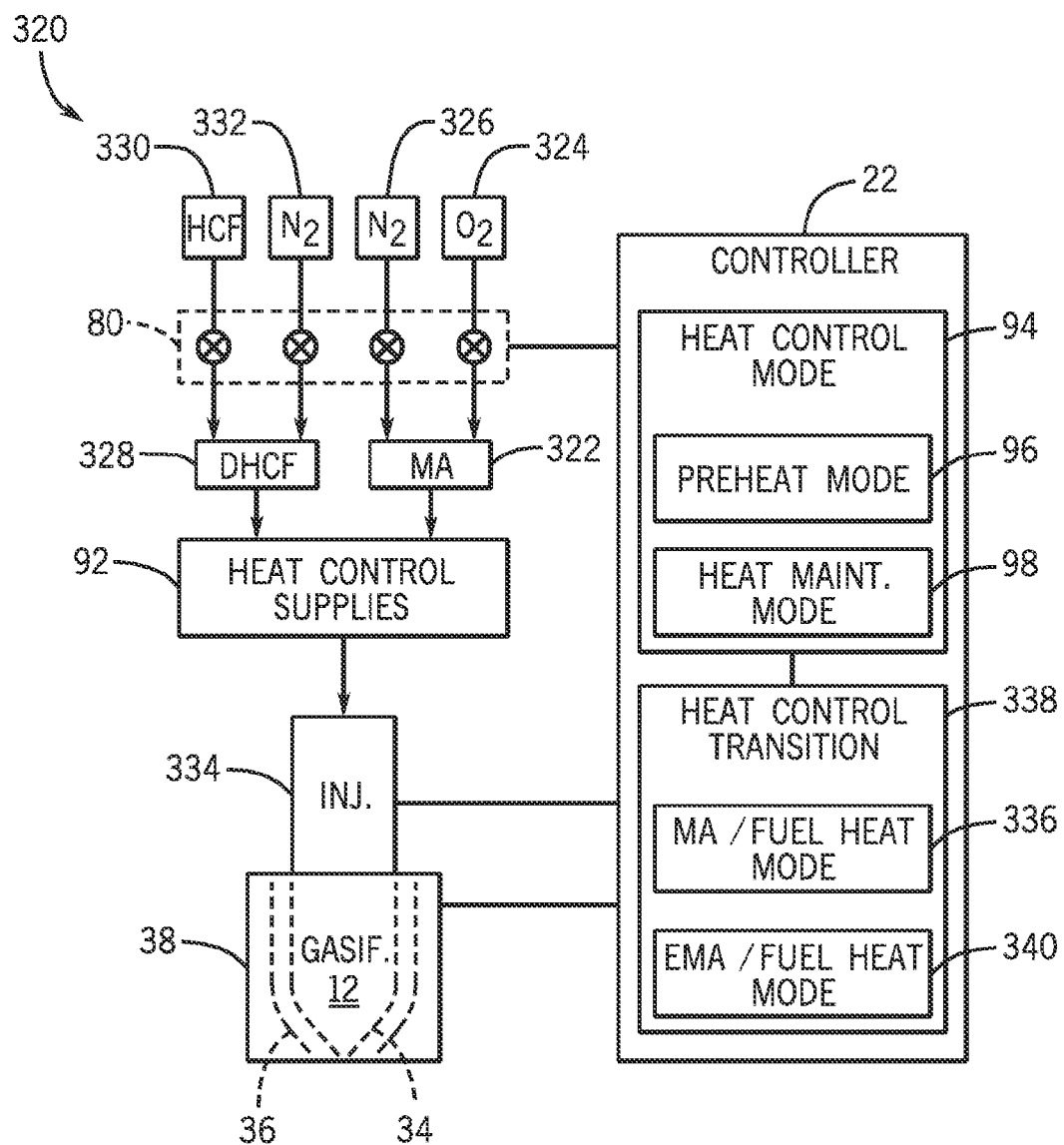
FIG. 11 is a schematic representation of an embodiment of certain components of the gasification system of FIG. 10 for use with a preheat injector.

FIG. 11 is a schematic representation of an embodiment of certain components of the gasification system 320 of FIG. 10 including the gasifier injector 334 configured to heat the refractory liner 36 of the gasifier 12. Similar to the injector 14 of FIG. 2, the gasifier injector 334 is configured to inject the heat control supplies 92 into the gasifier 12 for combustion during the heat control mode 94. In FIG. 11, however, these heat control supplies 92 include the DHCF 328 and the mixed air 322, and the heat control supplies 92 may be generated and conveyed to the injector 334 in different ways, depending on the specific control mode and injector configuration. For example, the gasification system 320 may be configured to create the mixed air 322 with a ratio of the oxygen 324 and the nitrogen 326 that is substantially equivalent to air, such as when operating in a mixed air/fuel heat mode 336. For further example, the gasifier injector 334 may be configured to inject the heat control fuel 330 and the mixed air 322 with an additional amount of oxygen 324 into the gasifier 12 for combustion during the heat control mode 94, so that the additional oxygen 324 and the mixed air 322 combine to form an oxygen enriched mixed air. The illustrated heat control mode 94 may include a heat control transition 338 from the mixed air/fuel heat mode 336 to the oxygen enriched mixed air/fuel heat mode 340. That is, the gasifier injector 334 may be configured to inject the mixed air 322 without the additional amount of oxygen 324 during the mixed air/fuel heat mode 336 and to inject the mixed air 322 with the additional amount of oxygen 324 during the oxygen enriched mixed air/fuel heat mode 340. The controller 22 may control amounts of the oxygen 324 and the nitrogen 326 for creating both the mixed air 322 and the oxygen enriched mixed air based on sensor feedback. In certain embodiments, the mixed air may be combined and vented to allow adjustment of the mixed air composition by controller 22 prior to introducing the mixed air through injector 334 to heat the gasifier 12.

Figure 12:
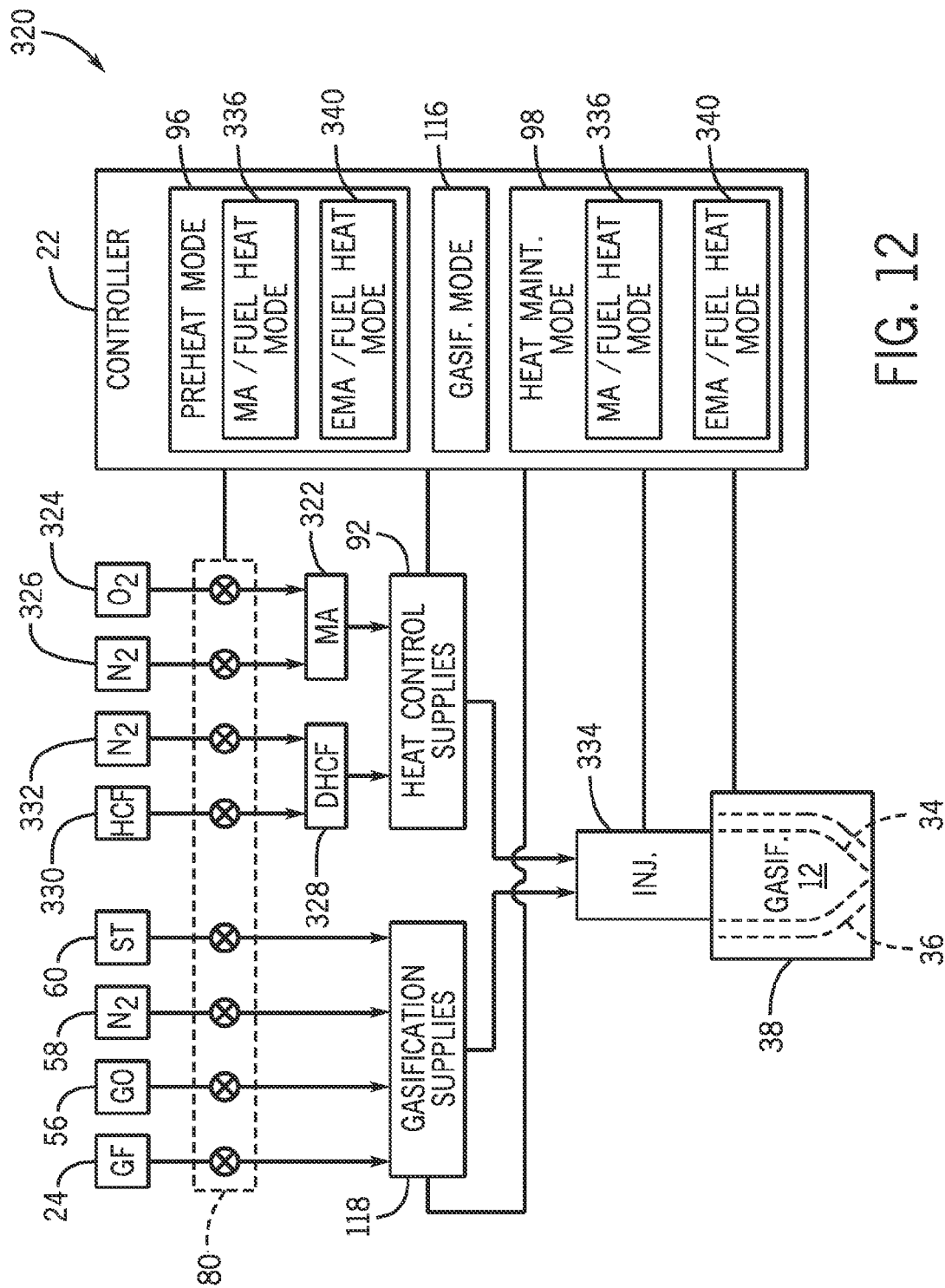
FIG. 12 is a schematic representation of an embodiment of certain components of the gasification system of FIG. 10 for use with a combination injector.

FIG. 12 is a schematic representation of an embodiment of certain components of the gasification system 320 of FIG. 10 where the gasifier injector 334 is a combination injector. As previously described in relation to FIGS. 3 and 11, the illustrated gasifier injector 334, gasification supplies 118, and heat control supplies 92 may be controlled by the controller 22 to transition between the preheat mode 96, gasification mode 116, and heat maintenance mode 98 based on sensor feedback. The heat control supplies 92, including the independent supplies of the oxygen 324 and the nitrogen 326 for creating the mixed air 322, may be controlled by the controller 22 as described in FIG. 11 to transition between the mixed air/fuel heat mode 336 and the oxygen enriched mixed air/fuel heat mode 340 while preheating or maintaining heat within the gasifier 36.

FIGS. 11 and 12 illustrate the mixed air 322 being created upstream of the gasifier injector 334. This may be accomplished through a mixing device (e.g., mixing chamber) located upstream of the gasifier injector 334 and designed to receive the oxygen 324 and the nitrogen 326 from the independent supplies. The mixing device may then create and output the mixed air 322 to the gasifier injector 334, as shown in the illustrated embodiment. In other embodiments, however, the gasifier injector 334 may be configured to mix the oxygen 324 and the nitrogen 326, which flow directly into the gasifier injector 334 before being combined.

Figure 13:
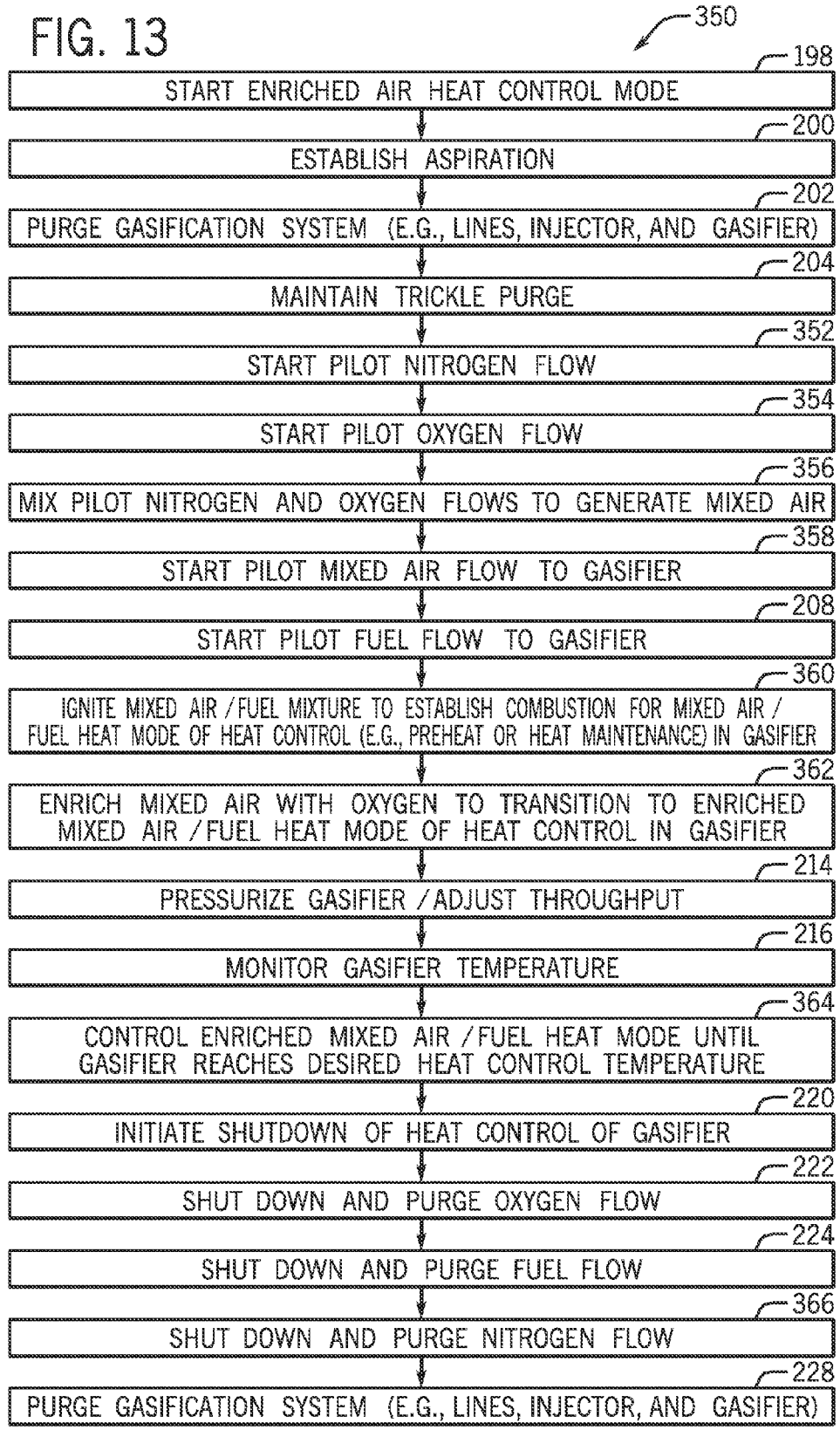
FIG. 13 is a flow chart of an embodiment of a method for operating certain components of a gasification system in a heat control mode using manufactured air.

FIG. 13 is a flow chart of an embodiment of a method 350 for operating certain components of a gasification system in the heat control mode 94 of FIG. 11 using the manufactured air 322 enriched with oxygen 324. This method 350 includes steps that apply for operating the gasification system of FIGS. 10-12 in the oxygen enriched air heat mode for preheating or maintaining heat in the gasifier, as described in FIGS. 4 and 5, using either a preheat injector or combination injector. The method 196 details the steps encompassed by preheat blocks 134, 136, and 138 and heat maintenance blocks 154, 156, and 158 for the preheat injector of FIG. 4, as well as preheat blocks 168, 170, and 172 and heat maintenance blocks 188, 190, and 192 for the combination injector of FIG. 5. As before, the method 350 includes one or more steps that may be computer implemented steps that correspond to code or instructions stored on a non-transitory, tangible, machine readable medium, such as a memory.

The method 350 includes several steps represented by equivalent blocks 198, 200, 202, 204, 208, 214, 216, 220, 222, 224, and 228 in FIG. 6. Other steps in the method 350 are different, however, due to the process of manufacturing the mixed air in the gasification system. For example, the method 350 includes starting the enriched air heat control mode (block 198), establishing aspiration (block 200), purging the gasification system, e.g., lines, injector, and gasifier (block 202), and maintaining trickle purges in open injector passages (204). After this, the method 350 includes executing the heat control mode by starting a pilot or initial nitrogen flow (block 352), which is a nitrogen flow of the nitrogen. The method 350 continues with starting a pilot or initial oxygen flow (block 354), which is an oxygen flow of the oxygen, followed by generating the mixed air by mixing the nitrogen flow and the oxygen flow (block 356). Instead of introducing a flow of air from a separate compressor, these steps allow the air to be mixed to a desired ratio of oxygen to nitrogen (e.g., substantially equivalent to air) according to the heating mode. The method 350 further includes starting a pilot or initial mixed air flow of the mixed air into the gasifier (block 358) before starting a pilot or initial fuel flow of the heat control fuel through the gasifier injector into the gasifier (block 208). The method 350 then includes igniting the mixed air/fuel mixture to establish combustion for the mixed air/fuel heat mode of heat control in the gasifier (block 360). The mixed air may then be enriched with oxygen to transition the combustion from the mixed air/fuel heat mode to the oxygen enriched mixed air/fuel heat mode (block 362). After pressurizing the gasifier and/or adjusting the throughput of the flows (block 214) and while monitoring the gasifier temperature (block 216), the method 350 includes controlling the enriched mixed air/fuel heat mode until the gasifier reaches the desired heat control temperature (block 364). Shutting down the heat control of the gasifier follows the same steps as outlined in FIG. 6 (blocks 220, 222, and 224), but after the oxygen and fuel flows are shut down, the only remaining flow into the gasifier is the nitrogen because the mixed air of the air/fuel mixture is manufactured from the oxygen and nitrogen flows. Therefore, the method 350 concludes with shutting down and purging the nitrogen flow (block 366) and purging the gasification system (block 228).

Figure 14:
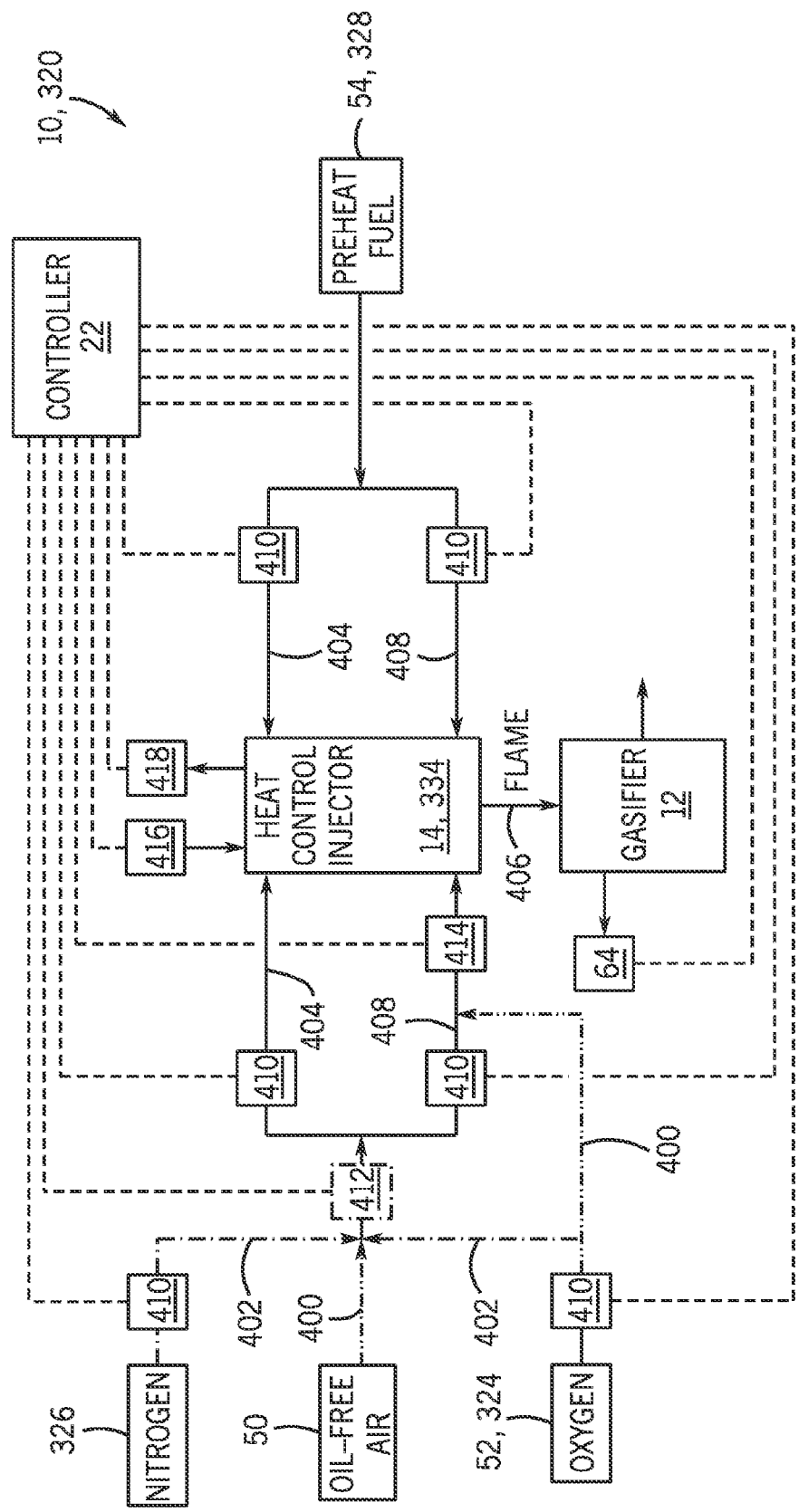
FIG. 14 is a schematic representation of an embodiment of certain components of a gasification system with a preheat injector, including flow lines for manufacturing air and/or enriching air with oxygen.

FIG. 14 is a schematic representation of an embodiment of certain components of a gasification system with a heat control injector (e.g., preheat or heat maintenance injector), including flow lines for manufacturing (e.g., from independent flows of oxygen and nitrogen) air and/or enriching air with oxygen. As previously shown in FIGS. 2 and 11, the gasification system 10, 320 includes a preheat injector 14, 334 used to inject a heat control fuel and either air, oxygen enriched air or mixed air into the gasifier 12 for combustion during the heat control mode. The heat control fuel may be the heat control fuel 54 or the diluted heat control fuel 328. The illustrated embodiment includes flow lines 400 used when the system 10, 320 operates in the oxygen enriched air/fuel heat mode 104, and flow lines 402 used when the system 10, 320 operates in the oxygen enriched mixed air/fuel heat mode 340. In either mode, the system 10, 320 establishes pilot flows of air or mixed air and fuel to the injector 14, 334 via pilot flow lines 404 for combustion, producing a flame 406 to heat the gasifier 12. Main flow lines 408 are used to convey additional heat control fuel 54, 328 and oxygen enriched air to the heat control injector 14, 334 to further increase the temperature of the gasifier 12.

The controller 22 may communicate with flow/pressure control devices 410 located along different flow lines 400, 402, 404, and 408 in order to control the flow rate and pressure of the different supplies entering the injector 14, 334. These devices 410 may include valves, such as the valves 80 of FIGS. 1-3 and 10-12. The controller 22 may control the devices 410 to either supply the air 50, or to mix the nitrogen 326 and the oxygen 52, 324 for producing mixed air, to the pilot and main flow lines 404 and 408. In addition, the controller 22 may receive feedback from a mixed air composition check device 412 when operating in the enriched mixed air/fuel heat mode 340. This device 412 may monitor the composition of the mixed air flowing therethrough (e.g., relative amounts of the oxygen 324 and the nitrogen 326 combined from flow lines 402), and the controller 22 may adjust the flows of these supplies accordingly to achieve the desired mixture of nitrogen and oxygen to produce mixed air (e.g., substantially equivalent to air). A similar oxygen enriched air composition check device 414 may be located along the main flow line 408 to monitor the composition of the air (e.g., air 50 or mixed air from flows of nitrogen 326 and oxygen 52, 324) after enrichment with the additional oxygen 52. The controller 22 may control an ignition system 416 based on the concentrations of the air and fuel mixture within the injector 14, 334 and receive feedback regarding combustion from a flame detection system 418. Finally, the controller 22 is configured to receive gasifier temperature feedback from the temperature sensor 64 within the gasifier 12. Other arrangements of the supplies, flow lines, and control devices may be employed in the gasification system 10, 320 in order to supply a desired mixture of air (manufactured and/or enriched with oxygen) to the injector 14, 334.

Figure 15:
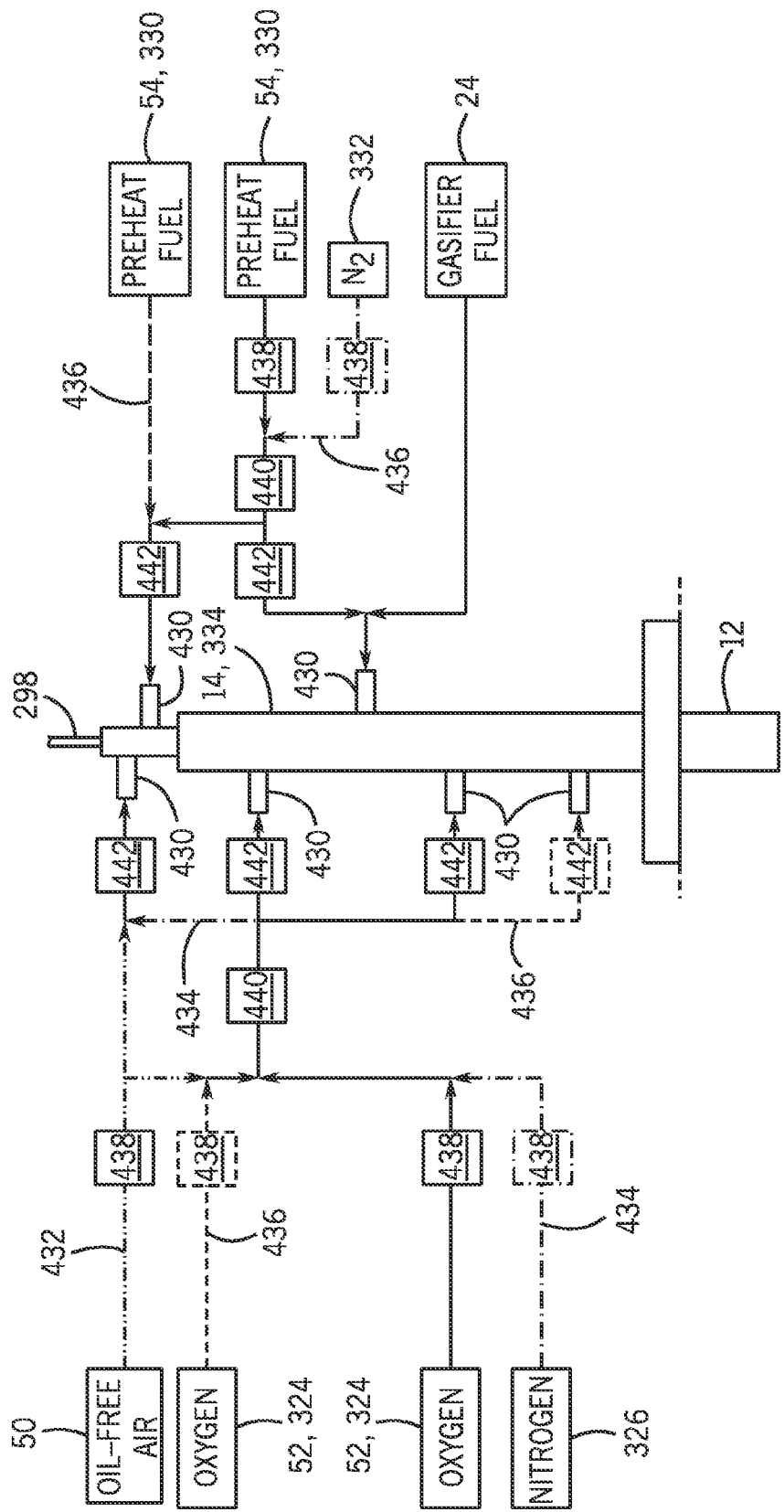
FIG. 15 is a schematic representation of an embodiment of certain components of a gasification system with a combination injector, including flow lines for manufacturing air and/or enriching air with oxygen.

FIG. 15 is a schematic representation of an embodiment of certain components of a gasification system with a combination injector, including flow lines for manufacturing air and/or enriching air with oxygen. The illustrated injector may perform the functions of injectors 14 and 334 as shown in FIGS. 3 and 12, respectively. That is, the injector 14, 334 is configured to transition between operation in a heating mode (e.g., preheat mode 96 or heat maintenance mode 98) and in a gasification mode 116. The system includes flow lines for conveying the various heat control supplies and gasification supplies to appropriate passages within the injector 14, 334 through inlet ports or nozzles 430. Each of the nozzles 430 may introduce different supplies into different passages within the injector 14, 334, such as the passages detailed in FIGS. 8 and 9. The supplies may include the air 50, additional oxygen 52, 324, nitrogen 326, HCF 54, 330, nitrogen 332 for diluting the HCF 54, 330, gasification fuel 24, and gasification oxidant 56. The gasification oxidant 56 may be oxygen provided from the same supply as the additional oxygen 52, 324 for the heat control mode or may flow to the injector 14, 334 from a separate supply through a different flow line.

The illustrated embodiment includes flow lines 432 that may be used when the air is supplied and other flow lines 434 that may be used when the air is mixed from independent supplies of the nitrogen 326 and oxygen 324. Certain flow lines 436 may be optional flow lines that may be opened and used to rebalance the flow of different supplies through the injector 14, 334 or provide additional flow paths for the corresponding supplies. Flow/pressure control devices 438 placed throughout the flow lines may control the flow rate and pressure of the supplies into the injector 14, 334, and composition check devices 440 may determine the composition of fuel or incoming air. The composition may be provided to the controller 22 as feedback for controlling the flow/pressure control devices 438. Flow control devices 442 also may be positioned upstream of each of the nozzles 430 to control the flow of different supplies into the injector 14, 334 according to the mode of operation of the gasification system.

Technical effects of the invention include, among other things, allowing a refractory liner of a gasifier to be heated above a threshold temperature using oxygen enriched air. Because of the relatively decreased concentration of nitrogen and increased concentration of oxygen with the air used for combustion to heat the gasifier, the gasifier may reach a higher temperature than would be possible using air without a higher content of oxygen for heating the gasifier. The controller may transition the gasification system between an air/fuel heat mode and an oxygen enriched air/fuel heat mode by simultaneously reducing the flow rate of air while enriching the air with oxygen as it flows into the gasifier through the injector. By heating the gasifier to a higher temperature, the system allows the gasifier to maintain an appropriate temperature for gasification for a relatively longer amount of time. In addition, the higher concentration of oxygen present in the air used to preheat the gasifier may increase the rate of the gasifier preheat and efficacy of fuel use, thereby heating the gasifier to an appropriate gasification temperature faster while using less fuel. Manufacturing the air used for heating the gasifier from independent supplies of nitrogen and oxygen may provide greater flexibility in controlling the relative concentrations of nitrogen and oxygen of the mixed air. In addition, by mixing the nitrogen and oxygen to produce the mixed air, the gasification system may operate without a separate air compressor, utilize flow lines and gas supplies that already exist in typical gasification systems, and redistribute flows of fuel and mixed air within the injector to balance the rates at which these supplies flow into the gasifier.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a gasifier injector; and
   a controller comprising a heat control mode configured to control injection of a heat control fuel and a mixed air through the gasifier injector into a gasifier for combustion, wherein the heat control fuel is the same or different from a gasification fuel used during a gasification mode in the gasifier, the controller is configured to control generation of the mixed air from independent supplies of oxygen and nitrogen, and the heat control mode is configured to control heating of the gasifier to a temperature at or above a temperature threshold while the gasifier is not operating in the gasification mode.

2. The system of claim 1, comprising a mixing device upstream from the gasifier injector, wherein the mixing device is configured to receive the oxygen and the nitrogen from the independent supplies, and the controller is configured to control a ratio of the oxygen and the nitrogen in the mixing device to create and output the mixed air to the gasifier injector.

3. The system of claim 1, wherein the controller is configured to control a ratio of the oxygen and the nitrogen through the gasifier injector to mix the oxygen and the nitrogen to create and output the mixed air to the gasifier.

4. The system of claim 3, wherein the gasifier injector comprises a first injection passage configured to flow a first mixed air portion, and a second injection passage to flow a second mixed air portion, wherein the controller is configured to control one or more ratios of the oxygen and the nitrogen to control generation of the first and second mixed air portions.

5. The system of claim 4, wherein the first injection passage is configured to flow the first mixed air portion and the heat control fuel, and the controller is configured to control generation of the first mixed air portion having a first portion of the nitrogen without the oxygen.

6. The system of claim 5, wherein the controller is configured to control generation of the second mixed air portion having a second portion of the nitrogen with the oxygen.

7. The system of claim 6, wherein the controller is configured to control flows through the gasifier injector to mix the first mixed air portion and the second mixed air portion to create the mixed air with the ratio of the oxygen and the nitrogen that is substantially equivalent to air.

8. The system of claim 6, wherein the controller is configured to control flows through the gasifier injector to mix the first mixed air portion and the second mixed air portion to create the mixed air with an additional amount of the oxygen, and the mixed air with the additional amount of the oxygen creates an oxygen enriched mixed air.

9. The system of claim 1, wherein the controller is configured to create the mixed air with a ratio of the oxygen and the nitrogen that is substantially equivalent to air.

10. The system of claim 1, wherein the controller is configured to control injection of the heat control fuel and the mixed air with an additional amount of the oxygen through the gasifier injector into the gasifier for combustion during the heat control mode, and the controller is configured to control generation of the mixed air with the additional amount of the oxygen to generate an oxygen enriched mixed air.

11. The system of claim 10, wherein the heat control mode of the controller comprises a heat control transition from a mixed air/fuel heat mode to an oxygen enriched mixed air/fuel heat mode, the controller is configured to control injection of the mixed air without the additional amount of the oxygen through the gasifier injector during the mixed air/fuel heat mode, and the controller is configured to control injection of the mixed air with the additional amount of the oxygen through the gasifier injector during the oxygen enriched mixed air/fuel heat mode.

12. The system of claim 10, wherein the controller is configured to control amounts of the oxygen and the nitrogen to create both the mixed air and the oxygen enriched mixed air based on sensor feedback.

13. The system of claim 1, comprising the gasifier having a gasification chamber, a refractory liner disposed about the gasification chamber, and an enclosure disposed about the refractory liner, wherein the heat control mode of the controller is configured to control heating of the refractory liner to a liner temperature at or above a liner temperature threshold while the gasifier is not operating in the gasification mode.

14. The system of claim 1, wherein the controller is configured to control injection of a first mixture of the heat control fuel and a first portion of the nitrogen via a fuel passage of the gasifier injector, and the controller is configured to control injection of the oxygen, or a second portion of the nitrogen, or air, or a combination thereof, through at least one additional injection passage of the gasifier injector.

15. The system of claim 14, wherein the controller is configured to reduce an amount of the air in the at least one additional injection passage to account for an increase in the nitrogen in the fuel injection passage.

16. The system of claim 14, wherein the controller is configured to control output quantities of the oxygen, the nitrogen, and/or the air from the gasifier injector in a first oxygen/nitrogen ratio, wherein the first oxygen/nitrogen ratio is either substantially equivalent to a second oxygen/nitrogen ratio of air, or the first oxygen/nitrogen ratio is richer in oxygen than the second oxygen/nitrogen ratio of air.

17. A system, comprising:
a controller comprising a heat control mode configured to control flows through a gasifier injector coupled to a gasifier, wherein the heat control mode of the controller is configured to control injection of a heat control fuel and a mixed air through the gasifier injector into the gasifier for combustion, the heat control fuel is the same or different from a gasification fuel used during a gasification mode in the gasifier, the controller is configured to control generation of the mixed air from independent supplies of oxygen and nitrogen, and the heat control mode is configured to control heating of the gasifier to a temperature at or above a temperature threshold while the gasifier is not operating in the gasification mode.

18. The system of claim 17, wherein the controller is configured to control the generation of the mixed air with a ratio of the oxygen and the nitrogen that is substantially equivalent to air.

19. The system of claim 17, wherein the controller is configured to control a ratio of the oxygen and the nitrogen to generate the mixed air with an additional amount of the oxygen, and the mixed air with the additional amount of the oxygen creates an oxygen enriched mixed air.

20. The system of claim 19, wherein the heat control mode of the controller comprises a heat control transition from a mixed air/fuel heat mode to an oxygen enriched mixed air/fuel heat mode, the controller is configured to inject the mixed air without the additional amount of the oxygen during the mixed air/fuel heat mode, and the controller is configured to inject the mixed air with the additional amount of the oxygen during the oxygen enriched mixed air/fuel heat mode.

21. The system of claim 17, wherein the controller is configured to execute the heat control mode by:
starting a nitrogen flow of the nitrogen;
starting an oxygen flow of the oxygen after the nitrogen flow;
generating the mixed air with the nitrogen flow and the oxygen flow;
starting a mixed air flow of the mixed air into the gasifier;
starting a fuel flow of the heat control fuel through the gasifier injector into the gasifier;
igniting a mixture of the mixed air flow and the fuel flow to establish combustion for a mixed air/fuel heat mode.

22. The system of claim 21, wherein the controller is configured to execute the heat control mode by:
enriching the mixed air with an additional amount of the oxygen to transition the combustion from the mixed air/fuel heat mode to an oxygen enriched mixed air/fuel heat mode.

23. The system of claim 17, wherein the heat control mode of the controller is configured to control injection of a first mixture of the heat control fuel and a first portion of the nitrogen through a fuel injection passage of the gasifier injector, and the heat control mode of the controller is configured to control injection of the oxygen, or a second portion of the nitrogen, or air, or a combination thereof, through at least one additional injection passage of the gasifier injector.

24. The system of claim 23, wherein the controller is configured to reduce an amount of the air in the at least one additional injection passage to account for an increase in the nitrogen in the fuel injection passage.

25. A method, comprising:
controlling, via a heat control mode of a controller, flows through a gasifier injector coupled to a gasifier, wherein controlling the heat control mode comprises:
controlling, via the controller, generation of a mixed air from independent supplies of oxygen and nitrogen; and
controlling, via the controller, injection of a heat control fuel and the mixed air into the gasifier for combustion, wherein the heat control fuel is the same or different from a gasification fuel used during a gasification mode in the gasifier; and
controlling, via the controller, heating of the gasifier to a temperature at or above a temperature threshold while the gasifier is not operating in the gasification mode.

26. The method of claim 25, wherein controlling the heat control mode comprises:
starting a nitrogen flow of the nitrogen;
starting an oxygen flow of the oxygen after the nitrogen flow;
generating the mixed air with the nitrogen flow and the oxygen flow;
starting a mixed air flow of the mixed air into the gasifier;
starting a fuel flow of the heat control fuel through the gasifier injector into the gasifier;
igniting a mixture of the mixed air flow and the fuel flow to establish combustion for a mixed air/fuel heat mode of the controller.

27. The method of claim 25, comprising:
controlling injection of a first mixture of the heat control fuel and a first portion of the nitrogen through a fuel injection passage of the gasifier injector; and
controlling injection of the oxygen, or a second portion of the nitrogen, or air, or a combination thereof, through at least one additional injection passage of the gasifier injector.

28. The system of claim 1, wherein the controller comprises the gasification mode, the controller is configured to control a transition between the heat control mode and the gasification mode, and the controller is configured to control a purge flow and depressurization of the gasifier during the transition.

29. The system of claim 1, wherein the controller is configured to execute the heat control mode by:
starting a nitrogen flow of the nitrogen;
starting an oxygen flow of the oxygen after the nitrogen flow;
generating the mixed air with the nitrogen flow and the oxygen flow;
starting a mixed air flow of the mixed air into the gasifier;
starting a fuel flow of the heat control fuel through the gasifier injector into the gasifier;
igniting a mixture of the mixed air flow and the fuel flow to establish combustion for a mixed air/fuel heat mode of the controller.

30. The system of claim 29, wherein the controller is configured to execute the heat control mode by enriching the mixed air with an additional amount of the oxygen to transition the combustion from the mixed air/fuel heat mode to an oxygen enriched mixed air/fuel heat mode of the controller.

31. The system of claim 1, wherein the heat control mode of the controller comprises a preheat control mode and a heat maintenance mode, the preheat mode of the controller is configured to control preheating of the gasifier to a first temperature at or above a first temperature threshold prior to operating the gasifier in the gasification mode, and the heat maintenance mode of the controller is configured to control heat maintenance of the gasifier to a second temperature at or above a second temperature threshold after operating the gasifier in the gasification mode.

* * * * *